United States Patent
Guo et al.

(10) Patent No.: US 12,273,944 B2
(45) Date of Patent: Apr. 8, 2025

(54) MULTI-LINK COMMUNICATION METHOD, APPARATUS, AND SYSTEM

(71) Applicant: Huawei Technologies Co., Ltd., Shenzhen (CN)

(72) Inventors: Yuchen Guo, Shenzhen (CN); Yunbo Li, Shenzhen (CN); Yifan Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 338 days.

(21) Appl. No.: 17/859,814

(22) Filed: Jul. 7, 2022

(65) Prior Publication Data

US 2022/0346166 A1    Oct. 27, 2022

Related U.S. Application Data

(63) Continuation of application No. PCT/CN2020/117079, filed on Sep. 23, 2020.

(30) Foreign Application Priority Data

Jan. 8, 2020   (CN) .......................... 202010019310.3

(51) Int. Cl.
*H04W 76/15* (2018.01)
*H04W 52/36* (2009.01)
*H04W 72/0453* (2023.01)

(52) U.S. Cl.
CPC ......... *H04W 76/15* (2018.02); *H04W 52/365* (2013.01); *H04W 72/0453* (2013.01)

(58) Field of Classification Search
None
See application file for complete search history.

(56) References Cited

U.S. PATENT DOCUMENTS 10,104,709 B2 * 10/2018 Ahn ..................... H04W 76/10
11,425,753 B2 *  8/2022 Aboul-Magd .... H04W 72/0446
(Continued)

FOREIGN PATENT DOCUMENTS

| CN | 104168658 A | 11/2014 |
| CN | 110519862 A | 11/2019 |
| WO | 2019050704 A1 | 3/2019 |

OTHER PUBLICATIONS

Guo et al., "Multi-Link Grouping," doc.: IEEE 802.11-20/0034r0, (Jan. 7, 2020) (Year: 2020).*

(Continued)

*Primary Examiner* — Nguyen H Ngo
(74) *Attorney, Agent, or Firm* — Leydig, Voit & Mayer, Ltd.

(57) ABSTRACT

Embodiments of this application provide a multi-link communication method, an apparatus, and a system that relate to the field of communication technologies, to resolve a technical problem in conventional multi-link communication that an amount of information sent by a multi-link device to a peer multi-link device is large, a process in which the peer multi-link device determines, based on the information, a link that can support simultaneous data sending and receiving as a link that is receiving data is cumbersome, and processing load of the peer multi-link device is heavy. The method includes: generating link grouping information, where the link grouping meets a following characteristic: links belonging to different link groups support simultaneous data sending and receiving; and sending the link grouping information.

18 Claims, 11 Drawing Sheets

(56) References Cited

U.S. PATENT DOCUMENTS

2010/0272051 A1* 10/2010 Fu .................... H04L 5/0046
                                                    370/329
2015/0381233 A1   12/2015 Goodson et al.
2020/0178299 A1*  6/2020 Yang ................ H04W 74/0808
2021/0136679 A1*  5/2021 Verma ............... H04W 72/0446
2021/0143957 A1*  5/2021 Gao .................. H04L 5/0044

OTHER PUBLICATIONS

Zhou et al., "Simultaneous Tx/Rx Capability indication for multi-link operation," Doc.: IEEE 802.11-19/1550r1, IEEE mentor, (Nov. 2019) (Year: 2019).*

Naribole et al., "Multi-link Channel Access Discussion," doc.: IEEE 802.11-19/1405r5, Date: Oct. 31, 2019, Total 17 pages (Nov. 2019).

Guo et al., "Multi-Link Grouping," doc.: IEEE 802.11-20/0034r0, Total 11 pages (Jan. 7, 2020).

Jauh et al., (Unisoc), "Multiple Link Asynchronous and Synchronous Transmission," doc.: IEEE 802.11-19/1678r0, IEEE mentor, Total 22 pages (Sep. 2019).

Zhou et al., (Huawei), "Simultaneous Tx/Rx Capability indication for multi-link operation," Doc.: IEEE 802.11-19/1550r1, IEEE mentor, Total 12 pages (Nov. 2019).

\* cited by examiner

MULTI-LINK COMMUNICATION METHOD, APPARATUS, AND SYSTEM

CROSS-REFERENCE TO RELATED APPLICATIONS

This application is a continuation of International Application No. PCT/CN2020/117079, filed on Sep. 23, 2020, which claims priority to Chinese Patent Application No. 202010019310.3, filed on Jan. 8, 2020. The disclosures of the aforementioned applications are hereby incorporated by reference in their entireties.

TECHNICAL FIELD

The present invention relates to the field of communication technologies, and in particular, to a multi-link communication method, an apparatus, and a system.

BACKGROUND

With development of wireless technologies, more wireless devices may support multi-band communication, communication on different channels on a same frequency band, or communication on different channels on different frequency bands, to improve communication efficiency between the wireless devices. In an example in which wireless devices support multi-band communication, the wireless devices may communicate with each other on frequency bands of 2.4 gigahertz (GHz), 5 GHZ, and 60 GHz at the same time.

Currently, a wireless device that supports multi-band or multi-channel communication may be referred to as a multi-link device. A multi-link device that communicates with another multi-link device may have at least one transmission reception point (TRP), and the TRP may send data to a peer TRP or receive data from the peer TRP on a frequency band or channel. The multi-link device may include a multi-link access point device or a multi-link station device. A TRP on a multi-link access point device may be referred to as an access point (AP), and a TRP on a multi-link station device may be referred to as at least one station (STA). For example, as shown in FIG. 1, a multi-link access point device may include at least one AP, and a multi-link station device may include at least one STA, where the STA operates on a specific frequency band or channel. An AP in a multi-link access point device may communicate with STAs in a plurality of multi-link station devices through preset links. As shown in FIG. 1, an AP1 of the multi-link device may communicate with a STA1 through a link L1, and an AP2 may communicate with a STA2 through a link L2. That is, multi-link communication can be performed.

When a plurality of links are used for communication, because of interference such as leakage of a signal sent through a link, a multi-link device may fail to simultaneously receive a signal through another link that is close to the link in frequency domain. As shown in FIG. 1, it is assumed that the link L1 and the link L2 are two links that are close in frequency domain. If signal leakage occurs when the AP1 sends a signal to the STA1 through the link L1, the AP2 located on a same multi-link access point device as the AP1 is easily interfered with by a signal sent through the link L1, and cannot receive a signal sent by the STA2 through the link L2. Consequently, the multi-link access point device cannot simultaneously send and receive the signals through the link L1 and the link L2. Similarly, the multi-link station device also has the foregoing problem that signals cannot be simultaneously sent and received through two links that are close in frequency domain.

To resolve this problem, when an existing multi-link device communicates with a peer multi-link device through a plurality of links, the multi-link device sends, to the peer multi-link device, information about whether any two of the plurality of links support simultaneous data sending and receiving. After the peer multi-link device receives the information, when sending data to the multi-link device, the peer multi-link device sends the data to the multi-link device based on the received information through a link, where the link and a link that is receiving data can support simultaneous data sending and receiving.

In this communication process, the multi-link device needs to send, to the peer multi-link device, the information about whether any two of the plurality of links support simultaneous data sending and receiving. Because an amount of the information is large, a process in which the peer multi-link device determines, based on the received information, the link that can support simultaneous data sending and receiving as the link that is receiving data is cumbersome, efficiency is low; and processing load of the peer multi-link device is heavy.

SUMMARY

In view of this, an objective of this application is to provide a multi-link communication method, an apparatus, and a system, to resolve a technical problem in conventional multi-link communication that an amount of information sent by a multi-link device to a peer multi-link device is large, a process in which the peer multi-link device determines, based on the information, a link that can support simultaneous data sending and receiving as a link that is receiving data is cumbersome, and processing load of the peer multi-link device is heavy.

To achieve the foregoing objective, embodiments of this application use the following technical solutions.

According to a first aspect, a multi-link communication method is provided. The method may include: a multi-link device generates link grouping information indicating that links belonging to different link groups support simultaneous data sending and receiving; and the multi-link device sends the link grouping information.

Based on the method according to the first aspect, the multi-link device may select the link grouping information from information about whether any two of a plurality of links between the multi-link device and a peer multi-link device support simultaneous data sending and receiving, and send the link grouping information to the peer multi-link device. Compared with the conventional technology in which a multi-link device sends information about whether any two of a plurality of links support simultaneous data sending and receiving, the link grouping information is simple, and an amount of information is reduced. In addition, the peer multi-link device may clearly know; based on the received link grouping information, that links in different link groups can support simultaneous data sending and receiving. The peer multi-link device may send data to the multi-link device through a link that is in a link group different from that of a link that is receiving data. This reduces complexity of a process in which the multi-link device determines a link that can support simultaneous data sending and receiving as a link that is receiving data, improves processing efficiency, and reduces processing load of the peer multi-link device.

In a possible design, with reference to the first aspect, there are at least two links that do not support simultaneous data sending and receiving in a same link group.

Based on the possible design, there are at least two links that do not support simultaneous data sending and receiving in the same link group. This can avoid a case in which any two links in a link group can support simultaneous data sending and receiving. If any two links in a link group can support simultaneous data sending and receiving, the link group may continue to be grouped, to increase a quantity of link groups. In this way, when the multi-link device communicates with the peer multi-link device, an available link can be selected from more link groups.

In a possible design, with reference to the first aspect or the possible design of the first aspect, there is at least one link that does not support simultaneous data sending and receiving as any link in the same link group.

Based on this possible design, if there is a link that can support simultaneous data sending and receiving as other links in the same link group, a new link group may be added, and the link is placed into the new link group, to increase a quantity of link groups. In this way, when the multi-link device communicates with the peer multi-link device, an available link can be selected from more link groups.

In a possible design, with reference to the first aspect, the link grouping information may be carried in a beacon frame, a sounding response frame, an authentication frame, an association response frame, a reassociation response frame, or a link grouping action frame.

Based on this possible design, the multi-link device may include the link grouping information in an existing frame, such as a beacon frame, a sounding response frame, an authentication frame, an association response frame, or a reassociation response frame, and send the existing frame to the peer multi-link device, without adding a new frame to carry the link grouping information. This reduces signaling interworking between the multi-link device and the peer multi-link device. In addition, the multi-link device may also create a new link grouping action frame, which is specially used to carry the link grouping information. This is not limited.

In a possible design, with reference to the first aspect or the possible design of the first aspect, the link grouping information includes a link profile of each link. The link profile of each link includes an operating class of the link, a channel number of the link, and a link group identifier of a link group to which the link belongs: the link profile of each link includes an operating class of the link, a channel number of the link, and a primary/secondary link identifier of the link: or the link profile of each link includes an operating class of the link and a channel number of the link.

Based on this possible design, the multi-link device may send, to the peer multi-link device, a related link profile of a link, such as an operating class, a channel number, a link group identifier of a link group to which the link belongs, and a primary/secondary link identifier of the link, so that the peer multi-link device identifies some characteristics of the link based on the related link profile. In this way, a corresponding operation is performed based on a characteristic of the link, which is simple and easy to implement. In addition, related information for representing the characteristic of the link is carried in the link grouping information and sent to the peer multi-link device, without adding extra information to carry the related information of the link. This reduces overheads caused by exchange of newly added information.

In a possible design, with reference to the first aspect or the possible design of the first aspect, the multi-link device may send data to the peer multi-link device or receive data from the peer multi-link device through at least one link in the same link group.

Based on this possible design, when communicating with the peer multi-link device, the multi-link device sends data to the peer multi-link device through the at least one link in the same link group, so that a plurality of links that do not support simultaneous data sending and receiving can be effectively utilized, instead of keeping some of the plurality of links that do not support simultaneous data sending and receiving idle. In this way, link resource utilization can be improved.

In a possible design, with reference to the first aspect or the possible design of the first aspect, the multi-link device may send data to the peer multi-link device or receive data from the peer multi-link device through all links in the same link group.

Based on this possible design, when communicating with the peer multi-link device, the multi-link device sends data to the peer multi-link device through all links that do not support simultaneous data sending and receiving, so that all the links that do not support simultaneous data sending and receiving are effectively utilized, without keeping a link of the plurality of links that do not support simultaneous data sending and receiving idle because the link causes interference. This improves link resource utilization in multi-link communication.

In a possible design, with reference to the first aspect or the possible design of the first aspect, a same link group includes a primary link and a secondary link. That the multi-link device sends data to the peer multi-link device includes: The multi-link device contends for a channel on the primary link, and sends the data to the peer multi-link device over the successfully contended channel after successfully contending for the channel on the primary link; and the multi-link device sends data to the peer multi-link device over a channel corresponding to the secondary link when a channel state of the channel corresponding to the secondary link is idle, or a channel state of the channel corresponding to the secondary link changes from non-idle to idle, and data is being sent through the primary link.

Based on the possible design, the multi-link device divides links in a same link group into a primary link and a secondary link. The multi-link device may contend for a channel only on the primary link, and does not need to contend for a channel on the secondary link, so as to reduce consumption caused by contention for a channel resource. In addition, after successfully contending for the channel, the multi-link device may send the data to the peer multi-link device through the primary link and a secondary link in an idle state, so that each link can be effectively utilized. This improves link resource utilization.

In a possible design, with reference to the first aspect or the possible design of the first aspect, that a channel state of the channel corresponding to the secondary link is idle may include: When signal energy on the secondary link is less than a first preset threshold, the channel state is idle: or when a network allocation vector NAV of the channel corresponding to the secondary link is equal to 0), and signal energy on the secondary link is less than a first preset threshold, the channel state is idle.

Based on this possible design, whether the secondary link is in an idle state may be determined based on the signal energy of the channel corresponding to the secondary link, or based on the NAV and the signal energy of the channel corresponding to the secondary link. In this way, when it is determined that the channel state of the secondary link is idle, data may be sent through the secondary link. This ensures normal data transmission.

In a possible design, with reference to the first aspect or the possible design of the first aspect, the data sent through the primary link is carried in a first physical layer protocol data unit PPDU, the data sent through the secondary link is carried in a second PPDU, and a time difference between an end time of the first PPDU and an end time of the second PPDU is less than a second preset threshold.

Based on this possible design, a time difference between end time of data sending through the primary link and the secondary link in the same link group may be less than a second preset threshold, to ensure, as much as possible, that sending data through the primary link and sending data through the secondary link in the same link group simultaneously end. This avoids interference with data transmission between links that do not support simultaneous data sending and receiving if some links in the link group are receiving data and the remaining links are sending data, and avoids affecting data receiving.

In a possible design, with reference to the first aspect or the possible design of the first aspect, the multi-link device receives, from the peer multi-link device, capability information that indicates whether any two of a plurality of primary links support simultaneous data sending and receiving.

Based on this possible design, the multi-link device may receive the capability information, so that the multi-link device can select an appropriate link group to send data to the peer multi-link device based on the capability information. This can avoid a problem that two links support simultaneous data sending and receiving in the multi-link device but do not support simultaneous data sending and receiving in the peer multi-link device, and data to the peer multi-link device cannot be received.

In a possible design, with reference to the first aspect or the possible design of the first aspect, the multi-link device is a multi-link access point device, and the peer multi-link device is a multi-link station device: the multi-link device is a multi-link station device, and the peer multi-link device is a multi-link access point device: or the multi-link device is a multi-link station device, and the peer multi-link device is a multi-link station device.

Based on this possible design, the multi-link communication method may be applied to a scenario of interaction between multi-link station devices or a scenario of interaction between a multi-link station device and a multi-link access point device. Application scenarios are diversified, and application flexibility of the multi-link communication method is improved.

According to a second aspect, a multi-link communication method is provided. The method may include: a multi-link device generates indication information indicating that a channel state of a channel corresponding to a first link is non-idle, and sends the indication information to a peer multi-link device when signal energy on the first link is greater than a first preset threshold, a network allocation vector NAV of the channel corresponding to the first link is not equal to 0, or the multi-link device receives a data frame over the channel corresponding to the first link.

Based on this possible design, the multi-link device may indicate the first link in a non-idle state to the peer multi-link device, so that the peer multi-link device determines a link state of the first link based on the indication information. This avoids an existing problem that the peer multi-link device inaccurately determines the link state of the first link in a case of inter-link interference.

In a possible design, with reference to the second aspect, that the multi-link device sends the indication information to a peer multi-link device may include: The multi-link device sends the indication information to the peer multi-link device over a channel corresponding to a second link.

Based on this possible design, the multi-link device may send the indication information to the peer multi-link device over a channel corresponding to another link. This ensures that the peer multi-link device correctly learns of the channel state of the channel corresponding to the first link.

In a possible design, with reference to the second aspect or the possible design of the second aspect, that the multi-link device sends the indication information to the peer multi-link device over a channel corresponding to a second link includes: The multi-link device sends an acknowledgment frame that includes the indication information to the peer multi-link device over the channel corresponding to the second link. The acknowledgment frame indicates whether the multi-link device correctly receives data sent by the peer multi-link device over the channel corresponding to the second link.

Based on this possible design, the multi-link device may include the indication information in the acknowledgment frame corresponding to the data, and send the acknowledgment frame to the peer multi-link device over the channel corresponding to the second link. In this way, the indication information may be carried in an existing frame, without adding new signaling/frame to carry the indication information. This reduces signaling interworking between devices.

In a possible design, with reference to the second aspect or the possible design of the second aspect, the first link and the second link support simultaneous data sending and receiving on the multi-link device; and the first link and the second link do not support simultaneous data sending and receiving on the peer multi-link device.

Based on this possible design, the foregoing multi-link communication method may be performed when the multi-link device supports simultaneous data sending and receiving through the first link and the second link, and the peer multi-link device does not support simultaneous data sending and receiving through the first link and the second link. This avoids a problem that when the peer multi-link device does not support simultaneous data sending and receiving through the first link and the second link, the peer multi-link device may incorrectly determine the channel state of the channel of the first link because the peer multi-link device fails to receive any message through the first link due to interference with the first link by another link.

According to a third aspect, a multi-link communication method is provided. The method may include: a peer multi-link device receives indication information from a multi-link device. The indication information indicates that a channel state of a channel corresponding to a first link is non-idle.

Based on the method of the third aspect, the peer multi-link device may receive indication information indicating that the first link is in a non-idle state from the multi-link device, so that the peer multi-link device determines the link state of the first link based on the indication information. This avoids an existing problem that the peer multi-link device inaccurately determines the link state of the first link in a case of inter-link interference.

In a possible design, with reference to the third aspect or the possible design of the third aspect, the peer multi-link device receives the indication information over a channel corresponding to a second link.

Based on this possible design, the peer multi-link device may receive the indication information sent by the multi-link device over a channel corresponding to another link. This ensures that the peer multi-link device correctly learns of the channel state of the channel corresponding to the first link.

In a possible design, with reference to the third aspect or the possible design of the third aspect, that the peer multi-link device receives the indication information over a channel corresponding to a second link includes: The peer multi-link device receives an acknowledgment frame from the multi-link device. The acknowledgment frame includes the indication information, and the acknowledgment frame indicates whether the multi-link device correctly receives data sent by the peer multi-link device over the channel corresponding to the second link.

Based on this possible design, the peer multi-link device may receive the acknowledgment frame that is sent by the multi-link device and that carries the indication information over the channel corresponding to the second link. In this way, the indication information may be carried in an existing frame, without adding new signaling/frame to carry the indication information. This reduces signaling interworking between devices.

In a possible design, with reference to the third aspect or the possible design of the third aspect, the first link and the second link support simultaneous data sending and receiving on the multi-link device; and the first link and the second link do not support simultaneous data sending and receiving on the peer multi-link device.

Based on this possible design, the foregoing multi-link communication method may be performed when the multi-link device supports simultaneous data sending and receiving through the first link and the second link, and the peer multi-link device does not support simultaneous data sending and receiving through the first link and the second link. This avoids a problem that when the peer multi-link device does not support simultaneous data sending and receiving through the first link and the second link, the peer multi-link device may incorrectly determine the channel state of the channel of the first link because the peer multi-link device fails to receive any message through the first link due to interference with the first link by another link.

According to a fourth aspect, a communication apparatus is provided. The communication apparatus may implement functions performed by the multi-link device in the first aspect or the possible designs of the first aspect, and the functions may be implemented by hardware by executing corresponding software. The hardware or the software includes at least one module corresponding to the foregoing functions. For example, the communication apparatus includes a processing module and a sending module.

The processing module is configured to generate link grouping information indicating that links belonging to different link groups support simultaneous data sending and receiving.

The sending module is configured to send the link grouping information.

For a specific implementation of the communication apparatus, refer to behavioral functions of the multi-link device in the multi-link communication method provided in the first aspect or any one of the possible designs of the first aspect. Based on the communication apparatus of the fourth aspect, the multi-link device may select the link grouping information from information about whether any two of a plurality of links between the multi-link device and a peer multi-link device support simultaneous data sending and receiving, and send the link grouping information to the peer multi-link device. Compared with the conventional technology in which a multi-link device sends information about whether any two of a plurality of links support simultaneous data sending and receiving, the link grouping information is simple, and an amount of information is reduced. In addition, the peer multi-link device may clearly know; based on the received link grouping information, that links in different link groups can support simultaneous data sending and receiving. The peer multi-link device may send data to the multi-link device through a link that is in a link group different from that of a link that is receiving data. This reduces complexity of a process in which the multi-link device determines a link that can support simultaneous data sending and receiving as a link that is receiving data, improves processing efficiency, and reduces processing load of the peer multi-link device.

In a possible design, with reference to the fourth aspect, there are at least two links that do not support simultaneous data sending and receiving in a same link group.

Based on the possible design, there are at least two links that do not support simultaneous data sending and receiving in the same link group. This can avoid a case in which any two links in a link group can support simultaneous data sending and receiving. If any two links in a link group can support simultaneous data sending and receiving, the link group may continue to be grouped, to increase a quantity of link groups. In this way, when the multi-link device communicates with the peer multi-link device, an available link can be selected from more link groups.

In a possible design, with reference to the fourth aspect or the possible design of the fourth aspect, there is at least one link that does not support simultaneous data sending and receiving as any link in the same link group.

Based on this possible design, if there is a link that can support simultaneous data sending and receiving as other links in the same link group, a new link group may be added, and the link is placed into the new link group, to increase a quantity of link groups. In this way, when the multi-link device communicates with the peer multi-link device, an available link can be selected from more link groups.

In a possible design, with reference to the fourth aspect, the link grouping information may be carried in a beacon frame, a sounding response frame, an authentication frame, an association response frame, a re-association response frame, or a link grouping action frame.

Based on this possible design, the multi-link device may include the link grouping information in an existing frame, such as a beacon frame, a sounding response frame, an authentication frame, an association response frame, or a re-association response frame, and send the existing frame to the peer multi-link device, without adding a new frame to carry the link grouping information. This reduces signaling interworking between the multi-link device and the peer multi-link device. In addition, the multi-link device may also create a new link grouping action frame, which is specially used to carry the link grouping information. This is not limited.

In a possible design, with reference to the fourth aspect or the possible design of the fourth aspect, the link grouping information includes a link profile of each link. The link profile of each link includes an operating class of the link, a channel number of the link, and a link group identifier of a link group to which the link belongs: the link profile of each link includes an operating class of the link, a channel number of the link, and a primary/secondary link identifier of the link: or the link profile of each link includes an operating class of the link and a channel number of the link.

Based on this possible design, the multi-link device may send, to the peer multi-link device, a related link profile of a link, such as an operating class, a channel number, a link group identifier of a link group to which the link belongs, and a primary/secondary link identifier of the link, so that the peer multi-link device identifies some characteristics of the link based on the related link profile. In this way, a corresponding operation is performed based on a characteristic of the link, which is simple and easy to implement. In addition, related information for representing the characteristic of the link is carried in the link grouping information and sent to the peer multi-link device, without adding extra information to carry the related information of the link. This reduces overheads caused by exchange of newly added information.

In a possible design, with reference to the fourth aspect or the possible design of the fourth aspect, the sending module may be further configured to send data to the peer multi-link device or receive data from the peer multi-link device through at least one link in the same link group.

Based on this possible design, when communicating with the peer multi-link device, the multi-link device sends data to the peer multi-link device through at least one link in the same link group, so that a plurality of links that do not support simultaneous data sending and receiving can be effectively utilized, instead of keeping some of the plurality of links that do not support simultaneous data sending and receiving idle. In this way, link resource utilization can be improved.

In a possible design, with reference to the fourth aspect or the possible design of the fourth aspect, the sending module may be further configured to send data to the peer multi-link device or receive data from the peer multi-link device through all links in the same link group.

Based on this possible design, when communicating with the peer multi-link device, the multi-link device sends data to the peer multi-link device through all links that do not support simultaneous data sending and receiving, so that all the links that do not support simultaneous data sending and receiving are effectively utilized, without keeping a link of the plurality of links that do not support simultaneous data sending and receiving idle because the link causes interference. This improves link resource utilization in multi-link communication.

In a possible design, with reference to the fourth aspect or the possible design of the fourth aspect, a same link group may include a primary link and a secondary link. That the multi-link device sends data to the peer multi-link device may include: The multi-link device contends for a channel on the primary link, and sends the data to the peer multi-link device over the successfully contended channel after successfully contending for the channel on the primary link; and the multi-link device sends data to the peer multi-link device over a channel corresponding to the secondary link when a channel state of the channel corresponding to the secondary link is idle, or a channel state of the channel corresponding to the secondary link changes from non-idle to idle, and data is being sent through the primary link.

Based on the possible design, the multi-link device divides links in a same link group into a primary link and a secondary link. The multi-link device may contend for a channel only on the primary link, and does not need to contend for a channel on the secondary link, so as to reduce consumption caused by contention for a channel resource. In addition, after successfully contending for the channel, the multi-link device may send the data to the peer multi-link device through the primary link and a secondary link in an idle state, so that each link can be effectively utilized. This improves link resource utilization.

In a possible design, with reference to the fourth aspect or the possible design of the fourth aspect, that a channel state of the channel corresponding to the secondary link is idle may include: When signal energy on the secondary link is less than a first preset threshold, the channel state is idle: or when a network allocation vector NAV of the channel corresponding to the secondary link is equal to 0), and signal energy on the secondary link is less than a first preset threshold, the channel state is idle.

Based on this possible design, whether the secondary link is in an idle state may be determined based on the signal energy of the channel corresponding to the secondary link, or based on the NAV and the signal energy of the channel corresponding to the secondary link. In this way, when it is determined that the channel state of the secondary link is idle, data may be sent through the secondary link. This ensures normal data transmission.

In a possible design, with reference to the fourth aspect or the possible design of the fourth aspect, the data sent through the primary link is carried in a first physical layer protocol data unit PPDU, the data sent through the secondary link is carried in a second PPDU, and a time difference between an end time of the first PPDU and an end time of the second PPDU is less than a second preset threshold.

Based on this possible design, a time difference between end time of data sending through the primary link and the secondary link in the same link group may be less than a second preset threshold, to ensure, as much as possible, that sending data through the primary link and sending data through the secondary link in the same link group simultaneously end. This avoids interference with data transmission between links that do not support simultaneous data sending and receiving if some links in the link group are receiving data and the remaining links are sending data, and avoids affecting data receiving.

In a possible design, with reference to the fourth aspect or the possible design of the fourth aspect, the communication apparatus further includes a receiving module. The receiving module is configured to receive, from the peer multi-link device, capability information that indicates whether any two of a plurality of primary links support simultaneous data sending and receiving.

Based on this possible design, the multi-link device may receive the capability information, so that the multi-link device can select an appropriate link group to send data to the peer multi-link device based on the capability information. This can avoid a problem that two links support simultaneous data sending and receiving in the multi-link device but do not support simultaneous data sending and receiving in the peer multi-link device, and data to the peer multi-link device cannot be received.

In a possible design, with reference to the fourth aspect or the possible design of the fourth aspect, the multi-link device is a multi-link access point device, and the peer multi-link device is a multi-link station device: the multi-link device is a multi-link station device, and the peer multi-link device is a multi-link access point device: or the multi-link device is a multi-link station device, and the peer multi-link device is a multi-link station device.

Based on this possible design, the multi-link communication method may be applied to a scenario of interaction between multi-link station devices or a scenario of interaction between a multi-link station device and a multi-link access point device. Application scenarios are diversified, and application flexibility of the multi-link communication method is improved.

According to a fifth aspect, a communication apparatus is provided. The communication apparatus may implement functions performed by the multi-link device in the second aspect or the possible designs of the second aspect, and the functions may be implemented by hardware by executing corresponding software. The hardware or the software includes at least one module corresponding to the foregoing functions. For example, the communication apparatus includes a processing module and a sending module.

The processing module is configured to generate indication information indicating that a channel state of a channel corresponding to a first link is non-idle when signal energy on the first link is greater than a first preset threshold, a network allocation vector NAV of the channel corresponding to the first link is not equal to 0, or the multi-link device receives a data frame over the channel corresponding to the first link.

The sending module is configured to send the indication information to a peer multi-link device.

For a specific implementation of the communication apparatus, refer to behavioral functions of the multi-link device in the multi-link communication method provided in the second aspect or any one of the possible designs of the second aspect. Based on the communication apparatus of the fifth aspect, the multi-link device may indicate the first link in a non-idle state to the peer multi-link device, so that the peer multi-link device determines a link state of the first link based on the indication information. This avoids an existing problem that the peer multi-link device inaccurately determines the link state of the first link in a case of inter-link interference.

In a possible design, with reference to the fifth aspect, the sending module is specifically configured to send the indication information to the peer multi-link device over a channel corresponding to a second link.

Based on this possible design, the multi-link device may send the indication information to the peer multi-link device over a channel corresponding to another link. This ensures that the peer multi-link device correctly learns of the channel state of the channel corresponding to the first link.

In a possible design, with reference to the fifth aspect or the possible design of the fifth aspect, the sending module is specifically further configured to send an acknowledgment frame to the peer multi-link device over a channel corresponding to a second link. The acknowledgment frame includes the indication information, and the acknowledgment frame indicates whether the multi-link device correctly receives data sent by the peer multi-link device over the channel corresponding to the second link.

Based on this possible design, the multi-link device may include the indication information in the acknowledgment frame corresponding to the data, and send the acknowledgment frame to the peer multi-link device over the channel corresponding to the second link. In this way, the indication information may be carried in an existing frame, without adding new signaling/frame to carry the indication information. This reduces signaling interworking between devices.

In a possible design, with reference to the fifth aspect or the possible design of the fifth aspect, the first link and the second link support simultaneous data sending and receiving on the multi-link device; and the first link and the second link do not support simultaneous data sending and receiving on the peer multi-link device.

Based on this possible design, the foregoing multi-link communication method may be performed when the multi-link device supports simultaneous data sending and receiving through the first link and the second link, and the peer multi-link device does not support simultaneous data sending and receiving through the first link and the second link. This avoids a problem that when the peer multi-link device does not support simultaneous data sending and receiving through the first link and the second link, the peer multi-link device may incorrectly determine the channel state of the channel of the first link because the peer multi-link device fails to receive any message through the first link due to interference with the first link by another link.

According to a sixth aspect, a communication apparatus is provided. The communication apparatus may implement functions performed by the peer multi-link device in the third aspect or the possible designs of the third aspect, and the functions may be implemented by hardware by executing corresponding software. The hardware or the software includes at least one module corresponding to the foregoing functions. For example, the communication apparatus includes a receiving module.

The receiving module is configured to receive, from a multi-link device, indication information indicating that a channel state of a channel corresponding to a first link is non-idle.

For a specific implementation of the communication apparatus, refer to behavioral functions of the peer multi-link device in the multi-link communication method provided in the third aspect or any one of the possible designs of the third aspect. Based on the communication apparatus of the sixth aspect, the peer multi-link device may receive the first link in a non-idle state indicated by the multi-link device, so that the peer multi-link device determines the link state of the first link based on the indication information. This avoids an existing problem that the peer multi-link device inaccurately determines the link state of the first link in a case of inter-link interference.

In a possible design, with reference to the sixth aspect or the possible design of the sixth aspect, the receiving module is specifically configured to receive the indication information through a channel corresponding to a second link.

Based on this possible design, the peer multi-link device may receive the indication information sent by the multi-link device over a channel corresponding to another link. This ensures that the peer multi-link device correctly learns of the channel state of the channel corresponding to the first link.

In a possible design, with reference to the sixth aspect or the possible design of the sixth aspect, that the receiving module is specifically configured to receive the indication information through a channel corresponding to a second link includes: The peer multi-link device receives an acknowledgment frame from the multi-link device. The acknowledgment frame includes the indication information, and the acknowledgment frame indicates whether the multi-link device correctly receives data sent by the peer multi-link device over the channel corresponding to the second link.

Based on this possible design, the peer multi-link device may receive the acknowledgment frame that is sent by the multi-link device and that carries the indication information over the channel corresponding to the second link. In this way, the indication information may be carried in an existing frame, without adding new signaling/frame to carry the indication information. This reduces signaling interworking between devices.

In a possible design, with reference to the sixth aspect or the possible design of the sixth aspect, the first link and the second link support simultaneous data sending and receiving on the multi-link device; and the first link and the second link do not support simultaneous data sending and receiving on the peer multi-link device.

Based on this possible design, the foregoing multi-link communication method may be performed when the multi-link device supports simultaneous data sending and receiving through the first link and the second link, and the peer multi-link device does not support simultaneous data sending and receiving through the first link and the second link. This avoids a problem that when the peer multi-link device does not support simultaneous data sending and receiving through the first link and the second link, the peer multi-link device may incorrectly determine the channel state of the channel of the first link because the peer multi-link device fails to receive any message through the first link due to interference with the first link by another link.

According to a seventh aspect, a communication apparatus is provided. The communication apparatus includes at least one processor and at least one memory. The at least one memory is coupled to the at least one processor, and the at least one memory is configured to store computer program code or computer instructions. When the at least one processor executes the computer instructions, the communication apparatus is enabled to perform the multi-link communication method according to the first aspect or any one of the possible designs of the first aspect, perform the multi-link communication method according to the second aspect or any one of the possible designs of the second aspect, or perform the multi-link communication method according to the third aspect or any one of the possible designs of the third aspect.

According to an eighth aspect, a computer-readable storage medium is provided. The computer-readable storage medium stores computer instructions or a program. When the computer instructions or the program is run on a computer, the computer is enabled to perform the multi-link communication method according to the first aspect or any one of the possible designs of the first aspect, perform the multi-link communication method according to the second aspect or any one of the possible designs of the second aspect, or perform the multi-link communication method according to the third aspect or any one of the possible designs of the third aspect.

According to a ninth aspect, a computer program product including instructions is provided. When the computer program product is run on a computer, the computer is enabled to perform the multi-link communication method according to the first aspect or any one of the possible designs of the first aspect, perform the multi-link communication method according to the second aspect or any one of the possible designs of the second aspect, or perform the multi-link communication method according to the third aspect or any one of the possible designs of the third aspect.

For technical effects achieved in any one of the designs of the seventh aspect to the ninth aspect, refer to the technical effects achieved in any one of the possible designs of the first aspect to the third aspect. Details are not described again.

According to a tenth aspect, a communication system is provided. The communication system includes the communication apparatus according to the fourth aspect or any one of the possible designs of the fourth aspect, includes the communication apparatus according to the fifth aspect or any one of the possible designs of the fifth aspect and the communication apparatus according to the sixth aspect or any one of the possible designs of the sixth aspect.

DESCRIPTION OF EMBODIMENTS

The following describes implementations of embodiments of this application in detail with reference to accompanying drawings in this specification.

A multi-link communication method provided in embodiments of this application may be applied to any communication system that supports wireless communication, for example, a second generation (2G) communication system, a third generation (3G) communication system, a next generation communication system, a global system for mobile communications (GSM), a code division multiple access (CDMA) system, a time division multiple access (TDMA) system, a wideband code division multiple access (WCDMA) system, a frequency division multiple access (FDMA) system, an orthogonal frequency division multiple access (OFDMA) system, a single-carrier FDMA (SC-FDMA) system, a general packet radio service (GPRS) system, a long term evolution (LTE) system, and another communication system of this type. This is not limited. In this application, the communication system shown in FIG. 1 is used as an example to describe the multi-link communication method.

Figure 1:
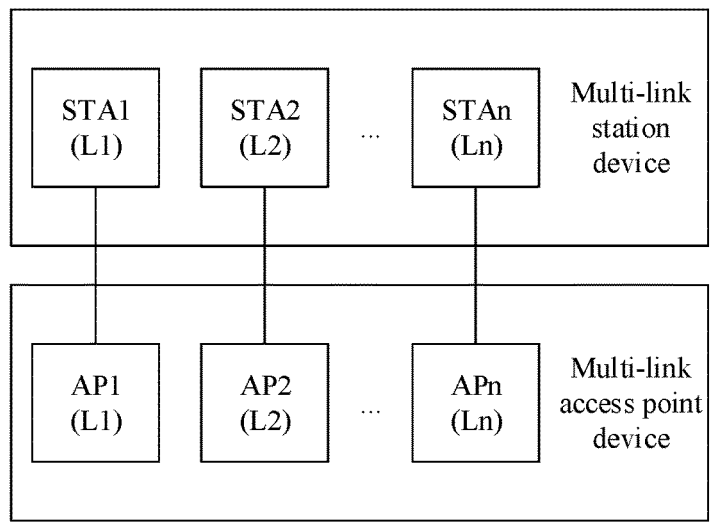
FIG. 1 is a simplified schematic diagram of a communication system according to an embodiment of this application.

FIG. 1 is a schematic diagram of a communication system according to an embodiment of this application. As shown in FIG. 1, the communication system may include a plurality of multi-link devices. The multi-link device may be a multi-link access point device, or may be a multi-link station device. A multi-link access point device may include at least one AP. A multi-link station device may include at least one STA. An AP on a multi-link access point device may communicate with a STA on a multi-link station device through a preset link. For example, an AP1 may communicate with a STA1 through a link L1. A STA in a multi-link station device may also communicate with a STA in another multi-link station device through a preset link, that is, the communication system may implement multi-link communication.

It should be noted that FIG. 1 is merely an example drawing, and a quantity of devices included in FIG. 1 is not limited. In addition to the devices shown in FIG. 1, the communication system may further include another device. This is not limited.

Currently, in the communication system shown in FIG. 1, when devices communicate with each other through a plurality of links, a multi-link device sends, to a peer multi-link device, information about whether any two of the plurality of links support simultaneous data sending and receiving. An amount of the information is large. After the peer multi-link device receives the information, when sending data to the multi-link device, the peer multi-link device sends the data to the multi-link device based on the received information through a link that can support simultaneous data sending and receiving as a link that is receiving data. Because of the large information amount, a process in which the peer multi-link device determines, based on the received information, a link that can support simultaneous data sending and receiving as a link that is receiving data is cumbersome, efficiency is low, and processing load of the peer multi-link device is heavy.

It should be noted that, in this embodiment of this application, supporting simultaneous data sending and receiving (simultaneously transmit and receive, STR) means that when sending data through a link, the multi-link device may receive data through another link. This is referred to as that the two links support simultaneous data sending and receiving. Failure to support simultaneous data sending and receiving means that when sending data through a link, the multi-link device cannot receive data through another link. This is referred to as that the two links cannot support simultaneous data sending and receiving.

To resolve the foregoing problem, this embodiment of this application provides a multi-link communication method. A multi-link device may select link grouping information from information about whether any two of a plurality of links between the multi-link device and a peer multi-link device support simultaneous data sending and receiving, and send the link grouping information to the peer multi-link device. Compared with the conventional technology in which a multi-link device sends information about whether any two of a plurality of links support simultaneous data sending and receiving, the link grouping information is simple, and an amount of information is reduced. In addition, the peer multi-link device may clearly know, based on the received link grouping information, that links in different link groups can support simultaneous data sending and receiving. The peer multi-link device may send data to the multi-link device through a link that is in a link group different from that of a link that is receiving data. This reduces complexity of a process in which the multi-link device determines a link that can support simultaneous data sending and receiving as a link that is receiving data, improves processing efficiency, and reduces processing load of the peer multi-link device. For the specific process, refer to the description in the following embodiment corresponding to FIG. 3A.

It should be noted that, in this embodiment of this application, the multi-link device may be the multi-link access point device in FIG. 1, and the peer multi-link device may be the multi-link station device in FIG. 1. Alternatively, the multi-link device may be the multi-link station device in FIG. 1, and the peer multi-link device may be the multi-link access point device in FIG. 1. Alternatively, the multi-link device may be the multi-link station device in FIG. 1, and the peer multi-link device may be another multi-link station device. This is not limited. A plurality of links may be established between the multi-link device and the peer multi-link device.

Figure 2:
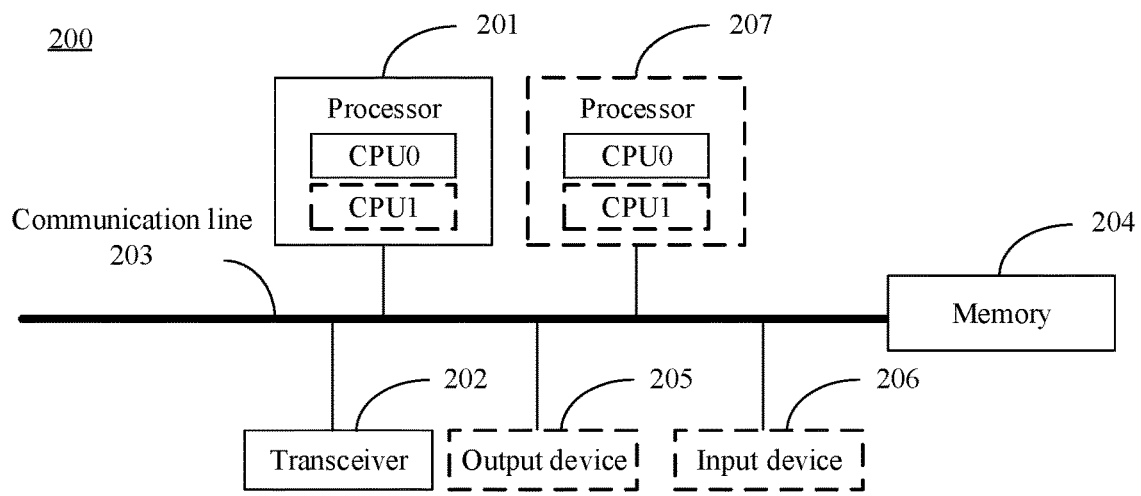
FIG. 2 is a schematic composition diagram of a communication apparatus according to an embodiment of this application.

In a specific implementation, each device shown in FIG. 1, for example, each multi-link device or each peer multi-link device, may use a composition structure shown in FIG. 2, or include components shown in FIG. 2. FIG. 2 is a schematic composition diagram of a communication apparatus 200 according to an embodiment of this application. The communication apparatus 200 may be a multi-link device, or a chip or a system on chip in the multi-link device. Alternatively, the communication apparatus 200 may be a peer multi-link device, or a chip or a system on chip in the peer multi-link device. As shown in FIG. 2, the communication apparatus 200 includes a processor 201, a transceiver 202, and a communication line 203.

Further, the communication apparatus 200 may include a memory 204. The processor 201, the memory 204, and the transceiver 202 may be connected through the communication line 203.

The processor 201 is a central processing unit (CPU), a general-purpose processor, a network processor (NP), a digital signal processor (DSP), a microprocessor, a microcontroller, a programmable logic device (PLD), or any combination thereof. Alternatively, the processor 201 may be another apparatus having a processing function, for example, a circuit, a component, or a software module. This is not limited.

The transceiver 202 is configured to communicate with another device or another communication network. The another communication network may be an Ethernet network, a radio access network (RAN), a wireless local area network (WLAN), or the like. The transceiver 202 may be a module, a circuit, a transceiver, or any apparatus that can implement communication.

The communication line 203 is configured to transmit information between components included in the communication apparatus 200.

The memory 204 is configured to store instructions. The instructions may be a computer program.

The memory 204 may be a read-only memory (ROM) or another type of static storage device that can store static information and/or instructions, a random access memory (RAM) or another type of dynamic storage device that can store information and/or instructions, an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or the like. This is not limited.

It should be noted that the memory 204 may exist independently of the processor 201, or may be integrated with the processor 201. The memory 204 may be configured to store instructions, program code, some data, or the like. The memory 204 may be located inside the communication apparatus 200, or may be located outside the communication apparatus 200. This is not limited. The processor 201 is configured to execute the instructions stored in the memory 204, to implement the multi-link communication method provided in the following embodiments of this application.

In an example, the processor 201 may include at least one CPU, for example, a CPU0 and a CPU1 in FIG. 2.

In an optional implementation, the communication apparatus 200 includes a plurality of processors. For example, in addition to the processor 201 in FIG. 2, the communication apparatus 200 may further include a processor 207.

In an optional implementation, the communication apparatus 200 further includes an output device 205 and an input device 206. For example, the input device 206 is a device such as a keyboard, a mouse, a microphone, or a joystick, and the output device 205 is a device such as a display or a speaker.

It should be noted that the communication apparatus 200 may be a desktop computer, a portable computer, a network server, a mobile phone, a tablet computer, a wireless terminal, an embedded device, a chip system, or a device with a structure similar to that in FIG. 2. In addition, the composition structure shown in FIG. 2 does not constitute a limitation on the communication apparatus. In addition to the components shown in FIG. 2, the communication apparatus may include more or fewer components than those shown in the figure, combine some components, or have different component arrangements.

In embodiments of this application, the chip system may include a chip, or may include a chip and another discrete component.

In addition, mutual reference may be made to actions, terms, and the like in embodiments of this application. This is not limited. In embodiments of this application, a name of a message exchanged between devices, a name of a parameter in a message, or the like is merely an example. In a specific implementation, another name may alternatively be used. This is not limited.

With reference to the communication system shown in FIG. 1, the following describes the multi-link communication method provided in embodiments of this application by using an example in which a multi-link device communicates with a peer multi-link device through a plurality of links. The multi-link device and the peer multi-link device described in the following embodiments may have the components shown in FIG. 2.

Figure 3A:
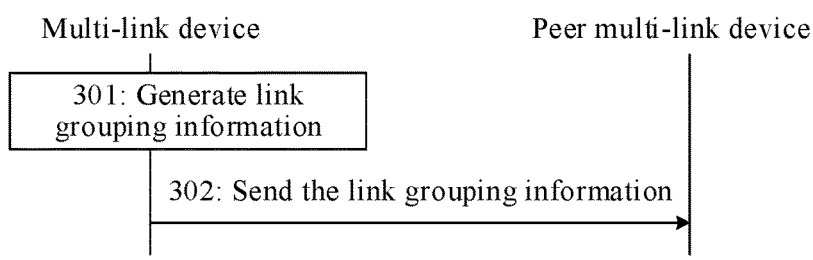
FIG. 3A is a schematic diagram of a multi-link communication method according to an embodiment of this application.

FIG. 3A shows a multi-link communication method according to an embodiment of this application. The method may be used to resolve a technical problem in conventional multi-link communication that link resources are wasted because some links cannot be effectively utilized. As shown in FIG. 3A, the method may include the following steps.

Step 301: A multi-link device generates link grouping information. The link grouping meets a following characteristic: Links belonging to different link groups support simultaneous data sending and receiving.

Simultaneous sending and receiving means that in a same period, sending is performed on some links, and receiving is performed on other links at the same time, which is simultaneously transmit and receive (STR).

Optionally, there are at least two links that do not support simultaneous data sending and receiving in a same link group. Alternatively, in other words, for a link L in a link group, there is at least one other link L* in the same link group, and the link L* and the link L cannot support simultaneous data sending and receiving.

Specifically, this can avoid a case in which any two links in a link group can support simultaneous data sending and receiving. If any two links in the link group can support simultaneous data sending and receiving, the link group may continue to be grouped, to increase a quantity of link groups. In this way, when the multi-link device communicates with the peer multi-link device, an available link can be selected from more link groups.

Optionally, there is at least one link that does not support simultaneous data sending and receiving as any link in the same link group. Alternatively, in other words, for any link L in a link group, there is at least one other link L* in the same link group, and the link L* and the link L cannot support simultaneous data sending and receiving.

Specifically, if there is a link that can support simultaneous data sending and receiving as other links in the same link group, a new link group may be added, and the link is placed into the new link group, to increase a quantity of link groups. In this way, when the multi-link device communicates with the peer multi-link device, an available link can be selected from more link groups.

In a possible design, the multi-link device may group the plurality of links between the multi-link device and the peer multi-link device according to a grouping rule and based on whether any two of the plurality of links support simultaneous data sending and receiving, to obtain the link grouping information.

The grouping rule may be any one of the following three rules.

Rule 1: Links belonging to different link groups support simultaneous data sending and receiving.

Rule 2: Links belonging to different link groups support simultaneous data sending and receiving, and there are at least two links that do not support simultaneous data sending and receiving in a same link group.

Rule 3: Links belonging to different link groups support simultaneous data sending and receiving, and there is at least one link that does not support simultaneous data sending and receiving as any link in the same link group.

For a method for grouping the plurality of links by using the rule 3 as an example, refer to descriptions in the following embodiment corresponding to FIG. 5.

Figure 4:
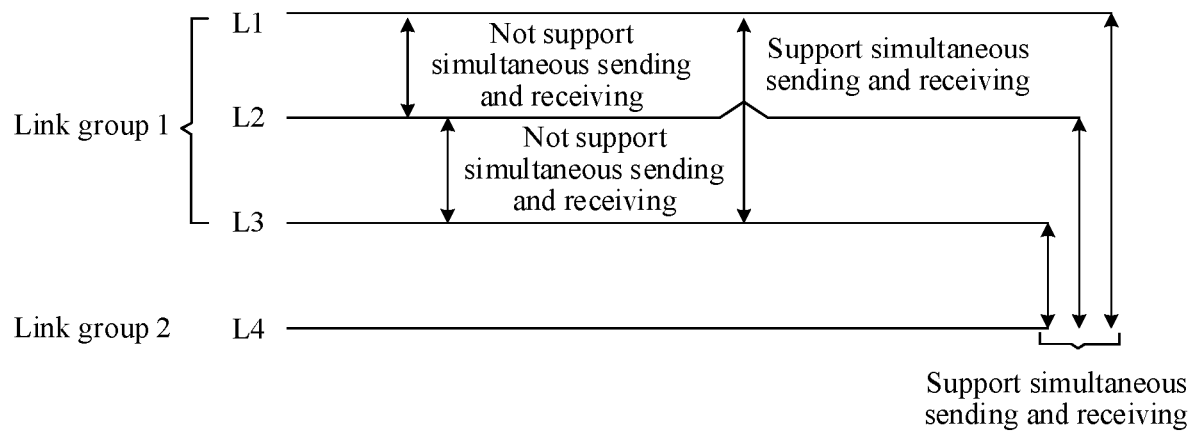
FIG. 4 is a schematic diagram of communication between a multi-link device and a peer multi-link device according to an embodiment of this application.

For example, in FIG. 4, the multi-link device is connected to the peer multi-link device through a link L1, L2, L3, or L4 for communication, that is, the plurality of links include the L1, L2, L3, and L4. If the L1 and L2 do not support simultaneous data sending and receiving, the L2 and L3 do not support simultaneous data sending and receiving, the L1 and L3 support simultaneous data sending and receiving, and the L4 and L1, and the L2 and L3 support simultaneous data sending and receiving. According to the foregoing grouping rules, the L1, L2, and L3 may be grouped to a link group 1, and the L4 may be grouped to a link group 2.

Step 302: The multi-link device sends link grouping information.

Specifically, after grouping the plurality of links, the multi-link device sends a grouping result to the peer multi-link device in a form of link grouping information. For details of the link grouping information, refer to descriptions in the following embodiments corresponding to FIG. 6A to FIG. 6C.

Based on the method according to FIG. 3A, the multi-link device generates the link grouping information, and sends the link grouping information to the peer multi-link device. Compared with the conventional technology in which a multi-link device sends information about whether any two of a plurality of links support simultaneous data sending and receiving, the link grouping information is simple, and an amount of information is reduced. In addition, the peer multi-link device may clearly know; based on the received link grouping information, that links in different link groups can support simultaneous data sending and receiving. The peer multi-link device may send data to the multi-link device through a link that is in a link group different from that of a link that is receiving data. This reduces complexity of a process in which the multi-link device determines a link that can support simultaneous data sending and receiving as a link that is receiving data, improves processing efficiency, and reduces processing load of the peer multi-link device.

Figure 3B:
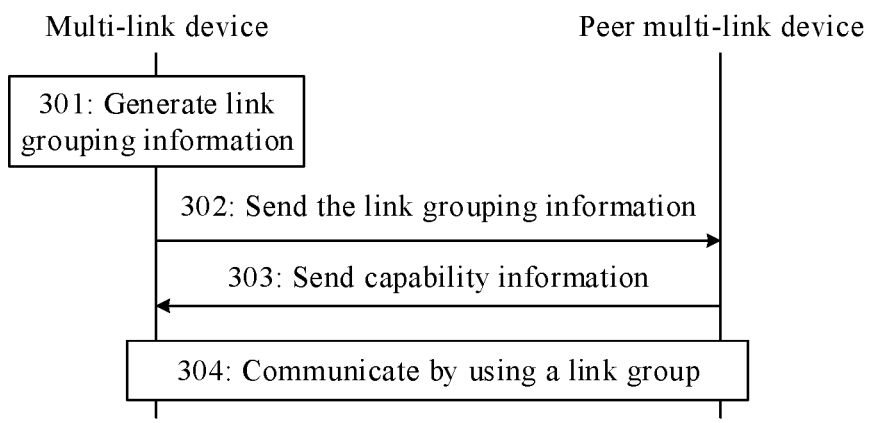
FIG. 3B is a schematic diagram of a multi-link communication method according to an embodiment of this application.

Optionally, as shown in FIG. 3B, the method may further include step 303 and step 304.

Step 303: The peer multi-link device sends capability information to the multi-link device.

After receiving the link grouping information, the peer multi-link device may determine, based on the grouping result of the plurality of links by the multi-link device, whether the peer multi-link device supports simultaneous data sending and receiving between any two links in the plurality of link groups, to obtain the capability information, and send the capability information to the multi-link device.

The capability information may indicate whether any two of the plurality of links support simultaneous data sending and receiving. For a frame structure of the capability information, refer to the following description in FIG. 8.

Step 304: The multi-link device communicates with the peer multi-link device through a link group.

Optionally, the multi-link device sends data to the peer multi-link device or receives data from the peer multi-link device based on the link grouping information and the capability information.

Figure 5:
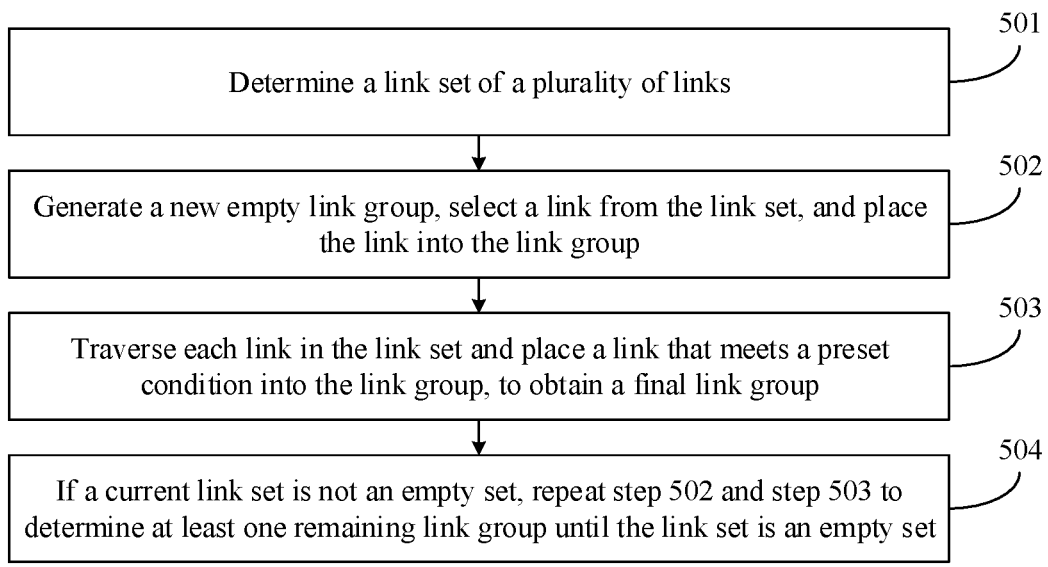
FIG. 5 is a schematic diagram of a multi-link grouping method according to an embodiment of this application.

In step 301, for a process in which the multi-link device groups the plurality of links based on whether any two of the plurality of links support simultaneous data sending and receiving in the rule 3 of the preset grouping rules, refer to FIG. 5. FIG. 5 shows a multi-link grouping method according to an embodiment of this application. As shown in FIG. 5, the multi-link grouping method may specifically include the following steps.

Step 501: A multi-link device determines a link set of a plurality of links.

The link set may be A={L1, L2, L3, . . . , Li, . . . , Ln}, where the Li represents an $i^{th}$ link between the multi-link device and a peer multi-link device.

For example, in FIG. 4, the multi-link device is connected to the peer multi-link device through a link L1, L2, L3, or L4 for communication, and the multi-link device may determine the link set A={L1, L2, L3, L4} based on the plurality of links.

Step 502: The multi-link device generates a new empty link group, selects a link from the link set, and places the link into the link group.

For example, the multi-link device may generate a link group Gk, select a link Li from the link set A, and put the Li into the Gk. The Li may be any link in the link set, for example, may be the first link, an intermediate link, or a last link. This is not limited.

Further, the multi-link device may delete a link that has been placed into the link group from the link set, that is, delete the Li from the link set A.

For example, in FIG. 4, the multi-link device may generate a link group G1, and may select the first link L1 from the link set A according to a link naming order, place the L1 into the G1, and delete the L1 from the link set A.

Step 503: The multi-link device traverses each link in the link set and places a link that meets a preset condition into the link group, to obtain a final link group.

The preset condition may include that a current link and at least one link in the link group do not support simultaneous data sending and receiving, or a current link and all other links in the link group do not support simultaneous data sending and receiving. Specifically, the multi-link device may determine whether two links support simultaneous data sending and receiving in the following manner (1), manner (2), or manner (3).

Manner (1): The multi-link device determines whether the two links support simultaneous data sending and receiving based on a distance between two links in frequency domain. If the distance between the two links in frequency domain is less than a distance threshold, it is considered that the two links do not support simultaneous data sending and receiving.

The distance between the two links in frequency domain may be a distance between frequency bands on which the two links are located.

The distance threshold is greater than or equal to a minimum distance between frequency bands of two links that can support simultaneous data sending and receiving.

Manner (2): The multi-link device may alternatively determine whether the two links support simultaneous data sending and receiving based on frequency locations of the two links. If the frequency locations of the two links meet an integer multiple relationship, it is considered that the two links do not support simultaneous data sending and receiving. A bandwidth threshold is greater than or equal to a minimum value of a difference between link bandwidths of two links that can support simultaneous data sending and receiving.

Manner (3): The multi-link device measures data sending and receiving on any two links, and determines whether the two links support simultaneous data sending and receiving based on a measurement result. For example, when sending data on one link, the multi-link device may measure a data receiving status on the other link. If energy of received data is less than a preset threshold, it is considered that the two links support simultaneous data sending and receiving. Otherwise, it is considered that the two links do not support simultaneous data sending and receiving.

Further, the multi-link device may delete the link from the link set after placing the link that meets the preset condition into the link group.

For each link in the link set, the multi-link device determines a current link and an existing link in the link group according to the preset condition. If there is at least one link in the link group that does not support simultaneous data sending and receiving as the current link, the multi-link device places the current link into the link group and deletes the current link from the link set. Otherwise, the multi-link device skips the current link and continues to determine other links in the link set.

For example, in FIG. 4, the link group G1 already includes the link L1. The multi-link device may select the link L2 from the link set A according to a link naming order, and determine whether simultaneous data sending and receiving is supported between the L2 and the L1. If simultaneous data sending and receiving is not supported between the L2 and the L1, the multi-link device adds the L2 to the G1 and deletes the L2 from the link set A. Otherwise, the multi-link device skips the L2, selects the L3 from the link set A, and determines whether simultaneous data sending and receiving is supported between the L3 and the L1. If simultaneous data sending and receiving is not supported between the L3 and the L1, the multi-link device places the L3 into the G1, and deletes the L3 from the link set A. Otherwise, the multi-link device skips the L3, selects the L4 from the link set, and determines whether simultaneous data sending and receiving is supported between the L4 and the L1. If simultaneous data sending and receiving is not supported between the L4 and the L1, the multi-link device places the L4 into the G1, and deletes the L4 from the link set A.

When the L2 and the L1 do not support simultaneous data sending and receiving, the multi-link device places the L2 into the G1. In this case, the G1 includes the L1 and the L2. The multi-link device may select the link L3 from the link set A according to a link naming order, and separately determines whether simultaneous data sending and receiving is supported between the L3 and the L1 and between the L3 and the L2. If simultaneous data sending and receiving is not supported between the L3 and the L1, or simultaneous data sending and receiving is not supported between the L3 and the L2, the multi-link device places the L3 into the G1, and deletes the L3 from link set A. Otherwise, if simultaneous data sending and receiving is supported between the L3 and the L1 and between the L3 and the L2, the multi-link device skips the L3, selects the L4 from the link set A, determines whether simultaneous data sending and receiving is supported between the L4 and the L1 and between the L4 and the L2, and determines whether to place the L4 into the G1 based on a determining result.

Each link in the link set is determined according to the determining method. A link that meets the preset condition is placed into the link group, to obtain a final link group.

If a new link is placed into the link group G1 in step 503, step 503 is repeated until no link can be placed into the link group G1.

Step 504: After the multi-link device determines a link included in a link group according to step 503, if a current link set is not an empty set, the multi-link device repeats step 502 and step 503 to determine at least one remaining link group until the link set is an empty set.

The current link set is a link set obtained after a link that is placed into the link group is deleted.

After step 503, if the current link set is not an empty set, the multi-link device repeats step 502 and step 503 to generate another empty link group, selects a link from the current link set to the empty link group, deletes the link from the current link set, performs determining on another link in the current link set in the determining manner in step 503, and places a link that meets the preset condition into the link group, to obtain a final link group.

For example, in FIG. 4, according to step 502 and step 503, if the first link group obtained by the multi-link device includes the L1, L2, and L3, the current link set further includes the L4. In this case, the multi-link device generates a second link group, places the L4 into the second link group, and deletes the L4 from the current link set. The current link set is an empty set, and the multi-link device completes the grouping.

If there is another link in addition to L4 in the current link set, the another link is determined one by one, and whether the another link is placed into the second link group is determined based on a determining result. The processing process is the same as the processing process in step 503. Details are not described again.

Step 501 to step 504 is an implementation of grouping a plurality of links. The grouping manner may alternatively be another manner. This is not limited.

Optionally, in the methods shown in FIG. 3A and FIG. 3B, to reduce signaling interworking, the multi-link device may carry the link grouping information in an existing frame, for example, a beacon frame, a sounding response frame, an authentication frame, an association response frame, or a re-association response frame, and send the existing frame to the peer multi-link device. The multi-link device may further define a new frame, for example, a link grouping action frame, carry the link grouping information in the link grouping action frame, and send the link grouping action frame to the peer multi-link device. This is not limited in this application. Frame structures of the beacon frame, the sounding response frame, the authentication frame, the association response frame, and the re-association response frame may be the same as those in the conventional technology, and details are not described in this application.

Figure 6A:
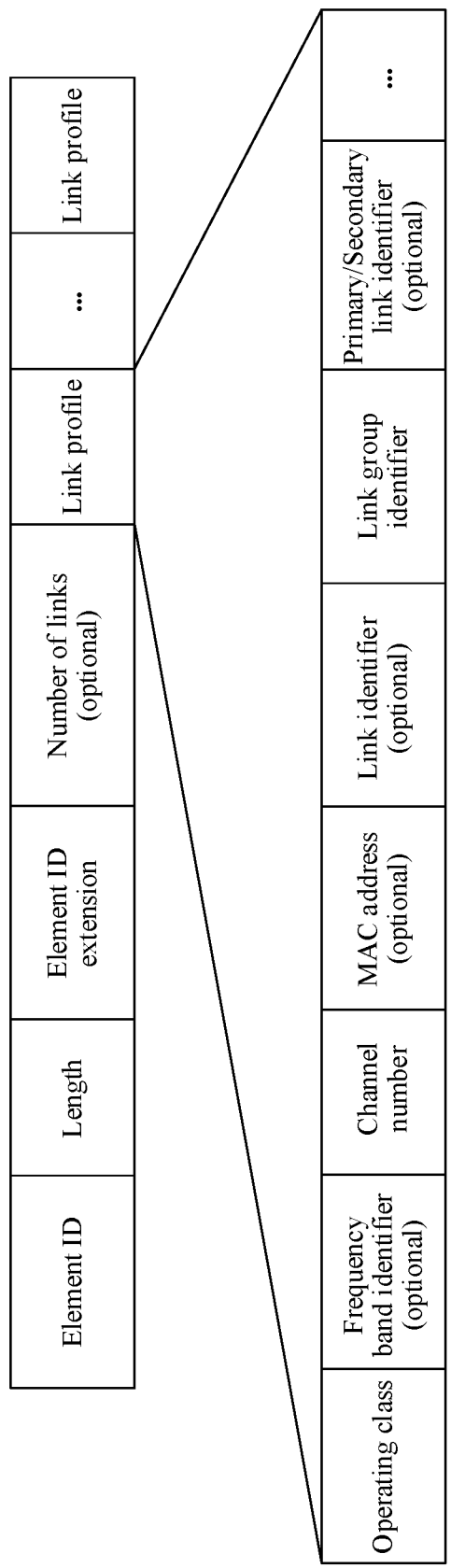
FIG. 6A is a schematic diagram of a frame structure of link grouping information according to an embodiment of this application.
Figure 6B:
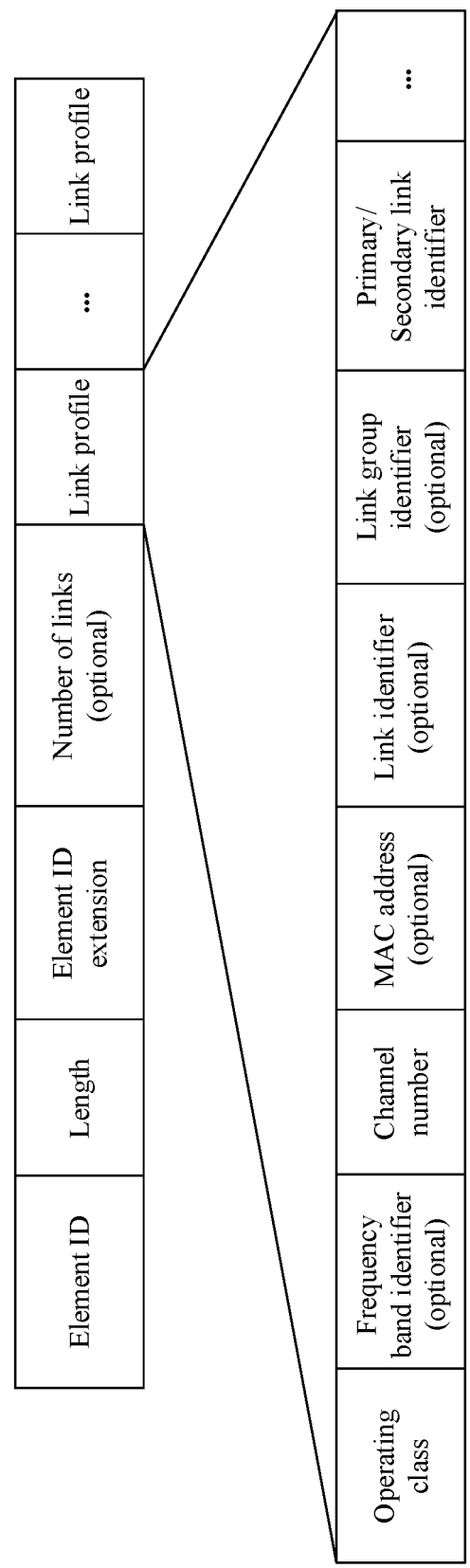
FIG. 6B is a schematic diagram of a frame structure of link grouping information according to an embodiment of this application.
Figure 6C:
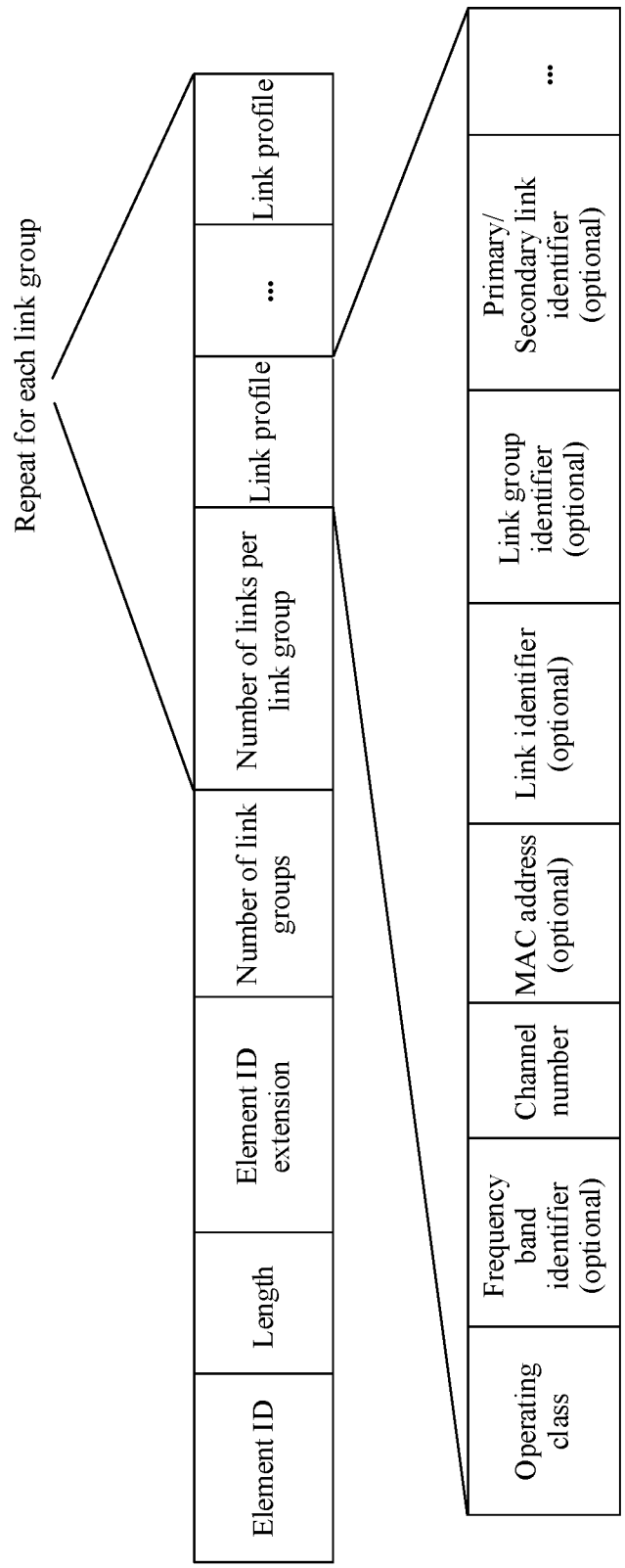
FIG. 6C is a schematic diagram of a frame structure of link grouping information according to an embodiment of this application.

The following uses FIG. 6A, FIG. 6B, and FIG. 6C as examples to describe the link grouping information.

As shown in FIG. 6A, the link grouping information includes a plurality of link profile fields, and each link profile field includes a link group identifier field, an operating class field, and a channel number field. The operating class and the channel number identify a link. The link group identifier identifies a link group in which the link identified by the operating class and the channel number is located. If link group identifier fields of two links are different, it indicates that the two links belong to different link groups. In this way, link groups can be distinguished by using the link group identifier fields.

Optionally, each link profile field further includes a frequency band identifier field, a MAC address field, a link identifier field, and a primary/secondary link identifier field. The frequency band identifier indicates a frequency band number of the link. The MAC address indicates a MAC address of a station that is on the multi-link device and that operates on the link. The link identifier indicates an identifier or a number of the link. The multi-link device may allocate a unique identifier number to each link to identify the link. The primary/secondary link identifier indicates that the current link is a primary link or a secondary link. Optionally, the link grouping information further includes a number of links field. The number of links indicates a quantity of the link profile fields in the link grouping information.

As shown in FIG. 6B, the link grouping information includes a plurality of link profile fields, and each link profile field includes a primary/secondary link identifier, an operating class, and a channel number. The operating class and the channel number identify a link. The primary/secondary link identifier indicates that the current link is a primary link or a secondary link. If two links are both primary links, it indicates that the two links belong to different link groups. In this way, link groups may be distinguished by using the primary/secondary link identifier.

Optionally, in the link grouping information, a link profile of each secondary link in a current link group may be placed after a link profile of a primary link in the current link group, and then a link profile of a primary link and a link profile of a secondary link in a next link group are placed.

Optionally, each link profile field further includes a frequency band identifier field, a MAC address field, a link identifier field, and a link group identifier field. The frequency band identifier indicates a frequency band number of a link. The MAC address indicates a MAC address of a station that is on the multi-link device and that operates on the link. The link identifier indicates an identifier or a number of the link. The multi-link device may allocate a unique identifier number to each link to identify the link. The link group identifier indicates a link group in which the link identified by the operating class and the channel number is located.

Optionally, the link grouping information further includes a number of links field. The number of links indicates a quantity of the link profile fields in the link grouping information.

As shown in FIG. 6C, the link grouping information includes a number of groups field, a number of links per group field, and a plurality of link profile fields. The number of groups indicates a quantity of link groups included in the link grouping information. The number of links per group indicates a quantity of links included in each link group in the linking group information. Each link profile field includes an operating class and a channel number, and the operating class and the channel number identify a link.

Specifically, a link profile of a primary link in each link group is placed in the first link profile field of the link group, and a link profile of a secondary link is sequentially placed in a link profile field following the link profile field corresponding to the primary link. By default, the first link profile field in each link group is the link profile of the primary link.

Optionally, each link profile field further includes a frequency band identifier field, a MAC address field, a link identifier field, a link group identifier field, and a primary/secondary link identifier field. The frequency band identifier indicates a frequency band number of a link. The MAC address indicates a MAC address of a station that is on the multi-link device and that operates on the link. The link identifier indicates an identifier or a number of the link. The multi-link device may allocate a unique identifier number to each link to identify the link. The link group identifier indicates a link group in which the link identified by the operating class and the channel number is located. The primary/secondary link identifier indicates that the current link is a primary link or a secondary link.

It should be noted that, in FIG. 6A, FIG. 6B, and FIG. 6C, (optional) indicates that the multi-link device may determine whether to include the field according to the foregoing method or a requirement. This is not limited.

In an actual application, a communication environment between the multi-link device and the peer multi-link device may change. When the communication environment between the multi-link device and the peer multi-link device changes, a new link may be added or an original link may be deleted between the multi-link device and the peer multi-link device. In this case, the link grouping information determined by the multi-link device according to the method shown in FIG. 5 may change.

To notify the peer multi-link device of the changed link grouping information in a timely manner, when the link grouping information changes, the multi-link device further sends the changed link grouping information to the peer multi-link device.

For example, the multi-link device may send the complete changed link grouping information to the peer multi-link device, or may send only the changed part of the link grouping information to the peer multi-link device.

Optionally, the multi-link device may send indication information to the peer multi-link device. The indication information may indicate whether the link grouping information sent by the multi-link device is complete or only the changed part of the link grouping information.

When the multi-link device sends only the changed part of link grouping information to the peer multi-link device, a link profile field in the link grouping information may include only a link whose link profile changes. The link grouping information may include a control field indicating that a link profile of the link indicated by the link profile field in the link grouping information changes. The control field may further include a counter field. If a value of the counter field changes, it indicates that the link profile of the link indicated by the link profile field in the link grouping information changes.

Figure 7:
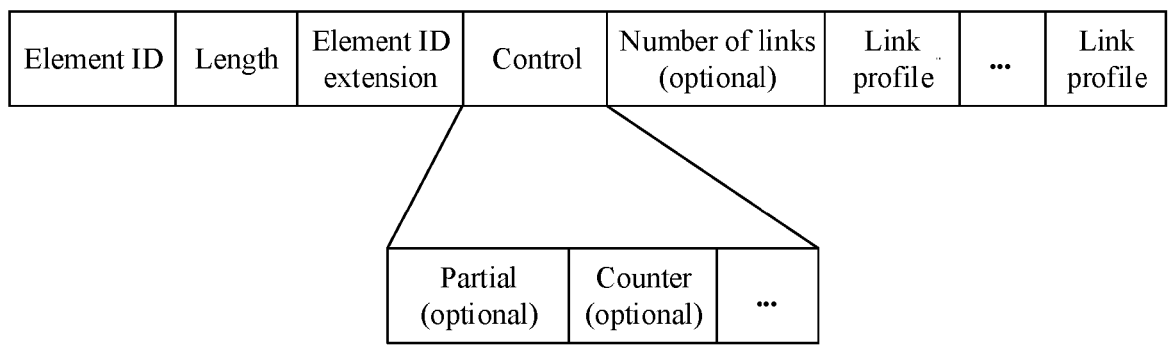
FIG. 7 is a schematic diagram of a frame structure of link grouping information according to an embodiment of this application.

As shown in FIG. 7, the link grouping information may include the control field. The control field includes a partial field, and the partial field indicates that the link profile field in the link grouping information includes only the link whose link profile changes. The control field further includes the counter field. If the value of the counter field changes, it indicates that the link profile of the link indicated by the link profile field in the link grouping information changes.

It should be noted that, in FIG. 7, (optional) indicates that the multi-link device may determine whether to include the field according to the foregoing method or a requirement. This is not limited.

As shown in FIG. 3B, in step 303, after obtaining the link grouping information sent by the multi-link device, the peer multi-link device may send the capability information of the peer multi-link device to the multi-link device. The capability information indicates whether any two of the plurality of links between the multi-link device and the peer multi-link device support simultaneous data sending and receiving.

Optionally, because the multi-link device has grouped the plurality of links to obtain at least one link group, the peer multi-link device may send, to the multi-link device, capability information that indicates whether any two of a plurality of primary links support simultaneous data sending and receiving, without sending, to the multi-link device, the capability information about whether any two of the plurality of links support simultaneous data sending and receiving, so as to reduce power consumption caused by determining, by the peer multi-link device, whether any two of the plurality of links support simultaneous data sending and receiving.

The multi-link device may support simultaneous data sending and receiving between two links, while the peer multi-link device does not support simultaneous data sending and receiving between the two links. Therefore, the multi-link device may send the link grouping information to the peer multi-link device, so that the peer multi-link device sends, to the multi-link device, the capability information about whether the peer multi-link device supports simultaneous data sending and receiving between any two of the plurality of links. To avoid a case in which the peer multi-link device cannot normally receive data due to signal sending interference between two links, when sending data to the peer multi-link device, the multi-link device may set, based on the capability information sent by the peer multi-link device, a plurality of link groups to send data to the peer multi-link device, where the plurality of link groups of the peer multi-link device do not support simultaneous data sending and receiving.

After the multi-link device groups the plurality of links, both two links belonging to different link groups support simultaneous data sending and receiving. Therefore, after the multi-link device sends the link grouping information to the peer multi-link device, the peer multi-link device may send, to the multi-link device, only capability information about whether the peer multi-link device supports simultaneous data sending and receiving between any two of the plurality of primary links, without sending, to the multi-link device, capability information about whether the peer multi-link device supports simultaneous data sending and receiving between any two of the plurality of links of the peer multi-link device.

Figure 8:
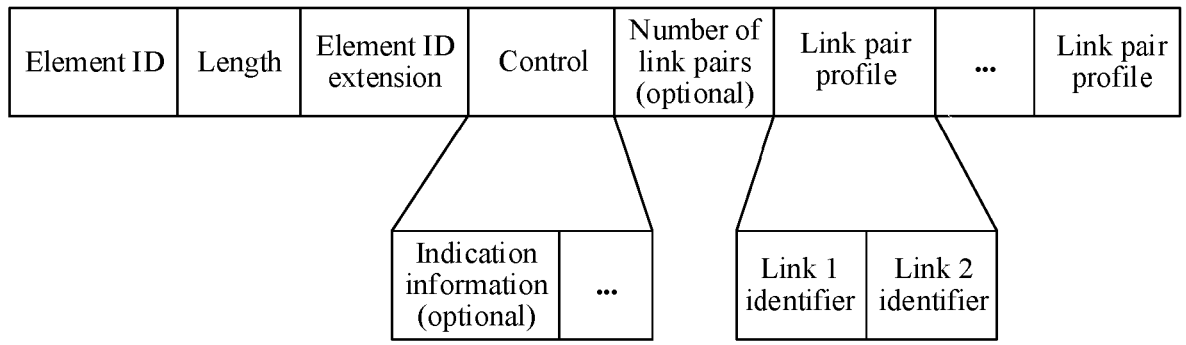
FIG. 8 is a schematic diagram of a frame structure of capability information according to an embodiment of this application.

In a possible design, a frame structure of the capability information may be shown in FIG. 8, and may include a plurality of link pair profile fields. Each link pair profile field may include identifiers of two links, for example, a link 1 identifier and a link 2 identifier. The identifiers indicate that the two links corresponding to the identifiers may support simultaneous data sending and receiving, or indicate that the two links corresponding to the identifiers do not support simultaneous data sending and receiving.

In another possible design, in the frame structure of the capability information, the link pair profile field may include two identifiers. One is an identifier of a first link, and the other is a product of link IDs of a plurality of links that support simultaneous data sending and receiving as the first link, or is a product of a link ID of a link that does not support simultaneous data sending and receiving as the link. A link ID of another link except the first link may be set to a prime number.

That the link pair profile field includes the identifier of the first link and the product of the link IDs of the plurality of links that support simultaneous data sending and receiving as the first link is used as an example. It is assumed that the identifier of the first link is 2, an identifier of a second link is 3, an identifier of a third link is 5, an identifier of a fourth link is 7, the first link and the second link support simultaneous data sending and receiving, the first link and the third link support simultaneous data sending and receiving, and the first link and the fourth link also support simultaneous data sending and receiving. The product 105 of the identifiers of the second link, the third link, and the fourth link, and the identifier 2 of the first link are placed into the link pair profile field. After receiving the link pair profile field, the multi-link device performs factor decomposition on 105, to obtain the identifiers of the second link, the third link, and the fourth link. It may be learned from the link pair profile field that the first link supports simultaneous data sending and receiving as the second link, the third link, and the fourth link.

In another possible design, in the frame structure of the capability information, the link pair profile field may include a bitmap, and each bit in the bitmap represents a link. For example, a bit whose index value is i in the bitmap represents a link whose link identifier is i. In the bitmap, bits corresponding to two links may be separately set to 1, to indicate that the two links can support simultaneous data sending and receiving, or to indicate that the two links cannot support simultaneous data sending and receiving. In the bitmap, all bits except the two bits that are set to 1 may be set to 0).

Alternatively, as shown in FIG. 8, the capability information in the foregoing two possible implementations may further include a control field. The control field may include an indication information field. The indication information field indicates that two links indicated by a link pair profile field support simultaneous data sending and receiving, or indicates that two links indicated by a link pair profile field do not support simultaneous data sending and receiving.

It should be noted that, in FIG. 8, (optional) indicates that the multi-link device may determine whether to include the field according to the foregoing method or a requirement. This is not limited.

After the multi-link device groups the links and sends the link grouping information to the peer multi-link device, the multi-link device may communicate with the peer multi-link device based on link grouping. For example, the multi-link device sends data to the peer multi-link device or receives data from the peer multi-link device through at least one link in the same link group, to avoid a case in which a link is sending data, and another link that does not support simultaneous data sending and receiving is affected and cannot receive data. In addition, a plurality of links that do not support simultaneous data sending and receiving are effectively utilized. This improves link resource utilization in multi-link communication.

Optionally, that the multi-link device sends data to the peer multi-link device or receives data from the peer multi-link device through at least one link in the same link group includes: The multi-link device sends data to the peer multi-link device or receives data from the peer multi-link device through some links in the same link group, or the multi-link device sends data to the peer multi-link device or receives data from the peer multi-link device through all links in the same link group.

For example, in FIG. 4, there are two link groups, the link group 1 and the link group 2, between the multi-link device and the peer multi-link device. The link group 1 includes the L1, L2, and L3, and the link group 2 includes the L4. When the multi-link device sends data to the peer multi-link device or receives data from the peer multi-link device, the L1 and the L2 in the link group 1 may be used, the L1, L2 and L3 in the link group 1 may be used, the L4 in the link group 2 may be used, the L2, L3 and L4 in the link group 1 and link group 2 may be used, or the L1, L2, L3, and L4 in the link group 1 and link group 2 may be used. This is not limited.

Figure 9:
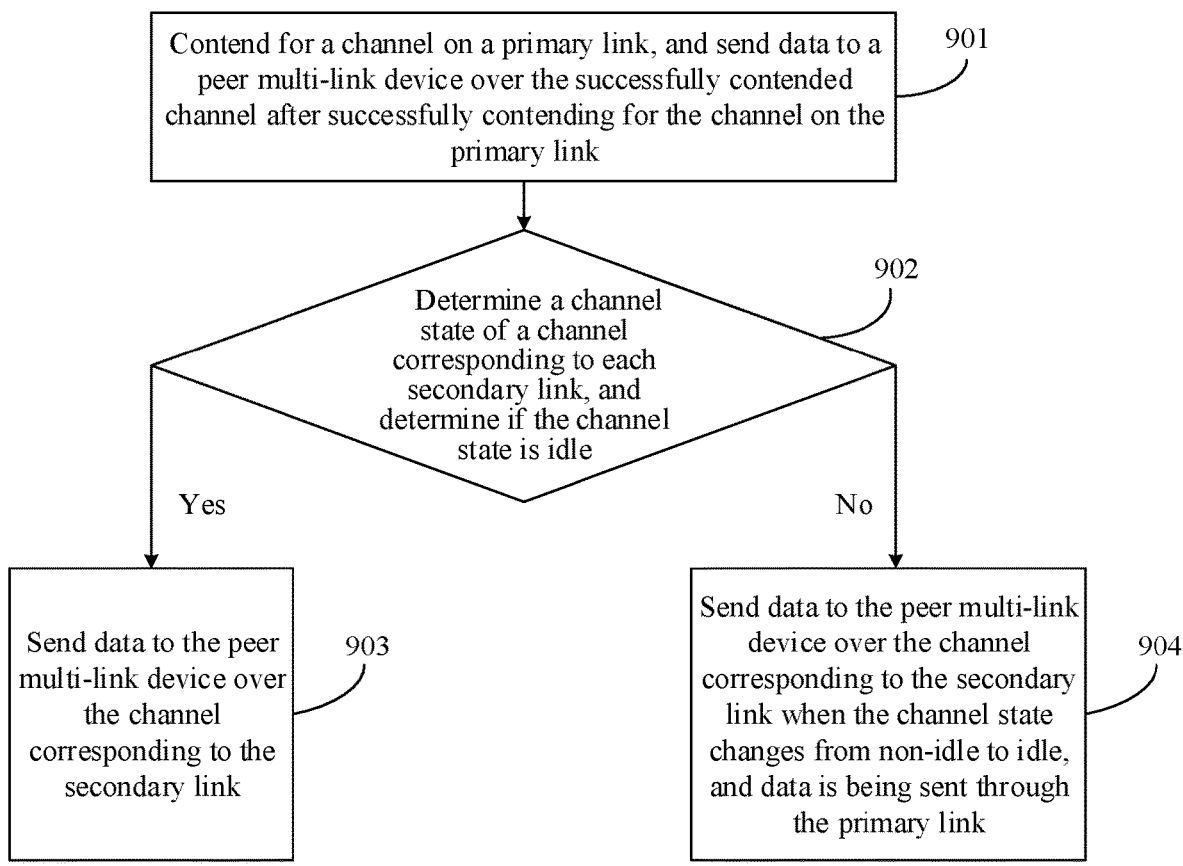
FIG. 9 is a schematic diagram of a multi-link communication method according to an embodiment of this application.

Specifically, as shown in FIG. 3B, for a process in which the multi-link device sends data to the peer multi-link device through a link group in step 304, refer to FIG. 9.

FIG. 9) shows a multi-link communication method according to an embodiment of this application. As shown in FIG. 9, the multi-link communication method may specifically include the following steps.

Step 901: A multi-link device contends for a channel on a primary link, and sends data to a peer multi-link device over the successfully contended channel after successfully contending for the channel on the primary link.

When performing communication through a link, the multi-link device implements the communication by transmitting data on a channel corresponding to the link. However, because a channel is shared by a plurality of multi-link devices and a plurality of peer multi-link devices, the multi-link device usually needs to contend for a channel on a primary link according to a channel contention mechanism, and sends data over the successfully contended channel after successfully contending for the channel on the primary link. For the channel contention mechanism, refer to conventional technology. Details are not described again.

For example, it is assumed that the multi-link device is a multi-link station device, and the peer multi-link device is a multi-link access point device. An AP1 of a multi-link access point device communicates with a STA11 of a multi-link station device 1 or a STA12 of a multi-link station device 2 over a channel corresponding to a link L1. Because both the STA11 of the multi-link station device 1 and the STA12 of the multi-link station device 2 need to communicate with the AP1 of the multi-link access point device over the channel corresponding to the link L1, the multi-link station device 1 and the multi-link station device 2 need to contend for the channel, and the multi-link station device that successfully contends for the channel sends data to the multi-link access point device over the successfully contended channel.

For links in the same link group, when the multi-link device sends data over the successfully contended channel on the primary link, to avoid a case in which data cannot be normally received due to signal sending interference between links that do not support simultaneous data sending and receiving, the multi-link device also sends data over a channel corresponding to a secondary link. Alternatively, when the multi-link device needs to send data through a secondary link, the multi-link device may simultaneously perform data transmission on the secondary link.

Step 902: The multi-link device determines a channel state of a channel corresponding to each secondary link, and performs step 903 if the channel state is idle, or performs step 904 if the channel state is non-idle.

When the multi-link device sends data through the primary link and the secondary link, the channel corresponding to the secondary link may be occupied by another multi-link device, and the multi-link device cannot send data through the secondary link. Therefore, the multi-link device may determine a channel state of a channel corresponding to each secondary link.

In a possible design, the multi-link device may monitor signal energy on the secondary link, and if a network allocation vector NAV of a channel corresponding to the secondary link is equal to 0), and the signal energy on the secondary link is less than a first preset threshold, determine that the channel state is idle.

Specifically, the multi-link device may receive a data frame on the secondary link, set the NAV based on the received data frame, and start a timer. For example, the multi-link device receives a data frame on the secondary link at a moment, sets the NAV to 10 based on the received data frame, starts the timer, and subtracts a value of the NAV by 1 every second until the NAV is 0). When determining the channel state, the multi-link device determines whether the NAV at the current moment is 0). If the NAV is not 0), the multi-link device determines that the channel state is non-idle, or if the NAV is 0, determines whether signal energy on the secondary link is less than a first preset threshold. If the signal energy on the secondary link is not less than the first preset threshold, the multi-link device determines that the channel state is non-idle, if the signal energy on the secondary link is less than the first preset threshold, the multi-link device determines that the channel state is idle.

In another possible design, the multi-link device may also monitor signal energy on the secondary link, and if the signal energy on the secondary link is less than a first preset threshold, determine that the channel state is idle.

Optionally, in the foregoing two possible designs, a time period in which the multi-link device monitors signal energy on the secondary link may be a predefined time period before the multi-link device performs data transmission through the primary link, and the predefined time period may be a point coordination function inter-frame space (PIFS).

It should be noted that step 901 and step 902 are not subject to a specific sequence. Step 901 may be performed before step 902, step 902 may be performed before step 901, or step 901 and step 902 may be simultaneously performed. This is not limited.

Step 903: Send data to the peer multi-link device over the channel corresponding to the secondary link.

When the channel state of the channel corresponding to the secondary link is idle, to avoid a case in which data cannot be normally received due to signal sending interference between links that do not support simultaneous data sending and receiving, the multi-link device separately sends data through the primary link and the secondary link over corresponding channels.

Step 904: Send data to the peer multi-link device over the channel corresponding to the secondary link when the channel state changes from non-idle to idle, and data is being sent through the primary link.

When the channel state of the channel corresponding to the secondary link is non-idle, but the multi-link device finds, in a process of sending data over the channel corresponding to the primary link, that the channel state of the channel corresponding to the secondary link changes from non-idle to idle, to avoid a case in which data cannot be normally received due to signal sending interference between links that do not support simultaneous data sending and receiving, the multi-link device sends data over the channel corresponding to the secondary link after the channel state of the channel corresponding to the secondary link changes to idle.

To capture a channel state change of the channel corresponding to the secondary link in time, the multi-link device may determine the channel state of the channel corresponding to the secondary link according to a preset cycle, so that the multi-link device can send data in time over the channel corresponding to the secondary link when the channel state of the channel corresponding to the secondary link changes from non-idle to idle.

To ensure that no other link is receiving data while a link is sending data in a same link group, the multi-link device may set the end time of data sending through the primary link to be the same as the end time of data sending through the secondary link, that is, the primary link and the secondary link stop data sending at the same time. Alternatively, a time difference between the two end time is less than a preset threshold. For example, the time difference may be 1 us, 2 us, 4 us, 8 us, 16 us, or the like. This is not limited.

Data sent over the channel corresponding to the primary link may be carried in a first physical layer protocol data unit (PPDU), and data sent over the channel corresponding to the secondary link may be carried in a second PPDU, that is, the end time of the first PPDU and the end time of the second PPDU are the same or a time difference between the two end time is less than the preset threshold.

Based on the method shown in FIG. 9, a same link group includes a primary link and a secondary link. When sending data by using the link group, the multi-link device contends for a channel on the primary link, and sends data to the peer multi-link device over the successfully contended channel after successfully contending for the channel on the primary link. To avoid a case in which data cannot be normally received due to signal sending interference between links that do not support simultaneous data sending and receiving in a same link group, when sending data through the primary link, the multi-link device may send data through the secondary link, so that no other link is receiving data while a link is sending data in the same link group. In addition, data is sent through a plurality of links in the link group, so that each link in the link group can be effectively utilized. This improves link resource utilization.

Optionally, in a multi-link communication process, to prevent another device from sending a data frame to the multi-link device through a secondary link that is in the same link group as the primary link when the multi-link device sends data through the primary link, the following rules are to be met for communication between the multi-link device and the peer multi-link device: When the multi-link device sends data through the primary link, only the multi-link device can contend for a channel through a secondary link that is in the same link group as the primary link. When sending data through the primary link, another device is not allowed to contend for a channel on a secondary link that is in the same link group as the primary link. Optionally, the multi-link device may send, to another device, indication information indicating that the another device is not allowed to perform channel contention on the secondary link.

Optionally, in a multi-link communication process, the multi-link device may support simultaneous sending and receiving through two links, while the peer multi-link device does not support simultaneous sending and receiving through the two links. In this case, communication between the multi-link device and the peer multi-link device needs to meet some or all of the following rules:

For the at least one link group obtained after grouping by the multi-link device, if the peer multi-link device supports simultaneous data sending and receiving between any two link groups in the at least one link group, the multi-link device may independently perform communication with the peer multi-link device on each link group.

If the peer multi-link device does not support simultaneous data sending and receiving between one link group and another link group in the at least one link group, when sending data to the peer multi-link device by using the link group, the multi-link device needs to ensure that the peer multi-link device does not use the another link group to send data. When sending data to the multi-link device by using the link group, the peer multi-link device needs to ensure that the peer multi-link device or another device does not receive, on the another link group, data sent to the peer multi-link device or the another device.

For example, the foregoing rules are described in detail by using an example in which the multi-link device groups the plurality of links between the multi-link device and the peer multi-link device to obtain the link group G1 and the link group G2.

If the peer multi-link device supports simultaneous data sending and receiving between the link group G1 and the link group G2, the multi-link device and the peer multi-link device may independently perform communication through the link group G1 and the link group G2.

If the peer multi-link device does not support simultaneous data sending and receiving between the link group G1 and the link group G2, when sending data to the peer multi-link device by using the link group G1, the multi-link device needs to ensure that the peer multi-link device does not send data through the link group G2. When sending data to the multi-link device by using the link group G1, the peer multi-link device needs to ensure that no data sent to the peer multi-link device is received through the link group G2.

If the multi-link device does not communicate with the peer multi-link device according to the preceding rules, the following problems may occur.

If the multi-link device supports simultaneous data sending and receiving through two links, but the peer multi-link device does not support simultaneous data sending and receiving through the two links, when the peer multi-link device sends data to the multi-link device over a channel corresponding to one of the two links, due to signal sending interference on the link, the peer multi-link device may not receive any data frame over a channel corresponding to the other link of the two links, and a data frame may be sent by another peer multi-link device or a multi-link device over the channel corresponding to the other link. Because the peer multi-link device cannot receive any data frame on the channel corresponding to the other link, the NAV cannot be set, the channel state cannot be determined according to the NAV value, and it may be considered that the channel state of the channel corresponding to the other link is idle (actually, the channel corresponding to the other link is being occupied by another peer multi-link device). When considering that the channel corresponding to the other link is idle, the peer multi-link device directly sends data to the multi-link device through the other link, however, because the channel corresponding to the other link is being occupied by another peer multi-link device, a conflict occurs between a data frame sent by the peer multi-link device and a data frame sent by the another peer multi-link device, and the multi-link device cannot receive any data frame over the channel corresponding to the other link.

Figure 10A:
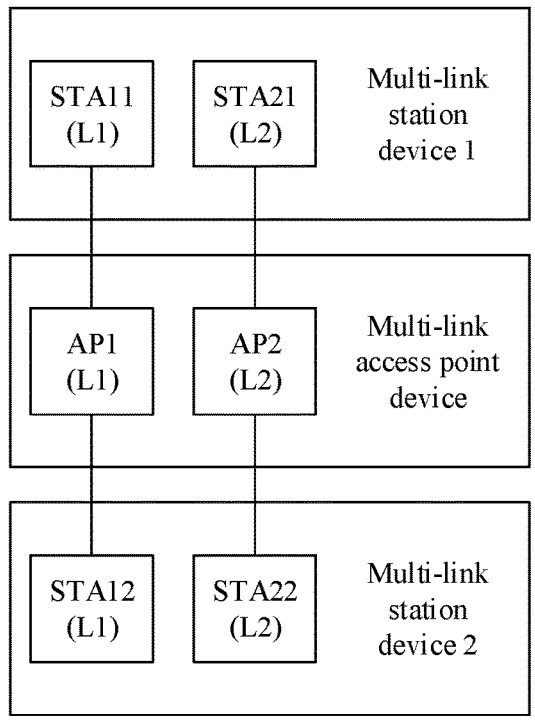
FIG. 10A is a schematic diagram of communication between a multi-link device and a peer multi-link device according to an embodiment of this application.
Figure 10B:
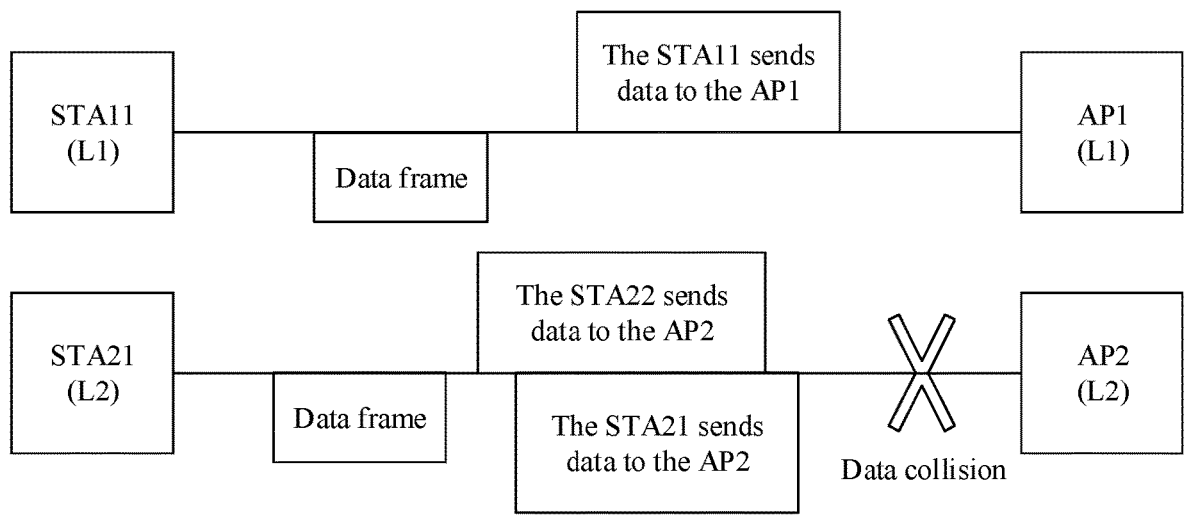
FIG. 10B is a schematic diagram of communication between a multi-link device and a peer multi-link device according to an embodiment of this application.

For example, in FIG. 10A and FIG. 10B, refer to FIG. 10A, a communication system includes a multi-link access point device, a multi-link station device 1, and a multi-link station device 2. The multi-link access point device includes an AP1 and an AP2, the multi-link station device 1 includes a STA11 and a STA21, and the multi-link station device 2 includes a STA12 and a STA22. It is assumed that the multi-link access point device supports simultaneous data sending and receiving between links L1 and L2, but the multi-link station device 1 does not support simultaneous data sending and receiving between the links L1 and L2. When the STA11 sends data to the AP1 over a channel corresponding to the link L1, because the multi-link station device 1 does not support simultaneous data sending and receiving between the L1 and L2, the STA21 cannot receive any data frame over a channel corresponding to the L2.

Refer to FIG. 10B, if the STA22 of the multi-link station device 2 is sending data to the AP2 over the channel corresponding to the L2 at this time, the AP2 may send a data frame to the STA21, to indicate that the channel corresponding to the link L2 is being occupied by the STA22 of the multi-link station device 2. However, because the multi-link station device 1 does not know that the multi-link station device 2 is transmitting data over the channel corresponding to the L2, and the STA21 cannot receive the data frame sent by the AP2, the channel corresponding to the L2 is mistakenly considered to be in an idle state, and data is sent to the AP2 over the channel corresponding to L2. Because the channel corresponding to the L2 is being occupied by the STA22, the STA21 and the STA22 simultaneously send data to the AP2 over the channel corresponding to the L2. Consequently, a conflict occurs between the sent data, and the AP2 cannot receive any data frame.

Figure 11:
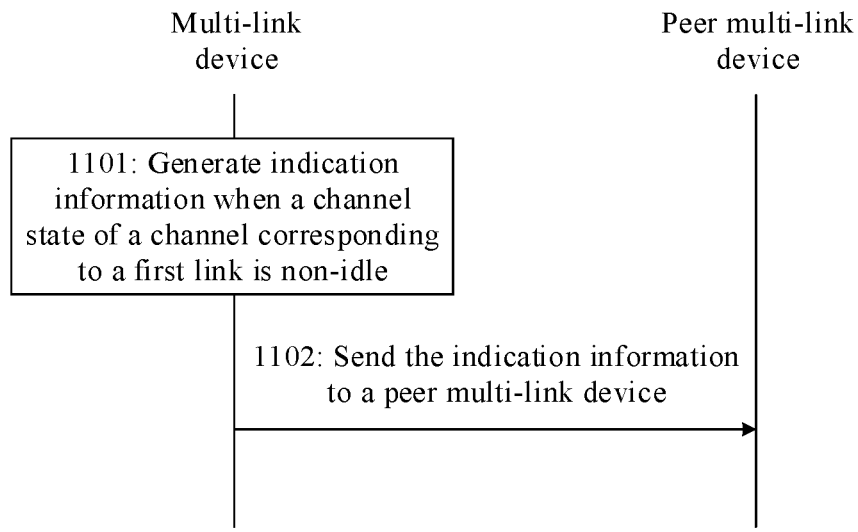
FIG. 11 is a schematic diagram of a multi-link communication method according to an embodiment of this application.

Refer to FIG. 11, an embodiment of the present invention provides a multi-link communication method. The method may be used to resolve a technical problem in conventional multi-link communication that, when a peer multi-link device sends data over a channel corresponding to a link, a channel state of a channel corresponding to another link is incorrectly determined because a data frame on the channel corresponding to the another link cannot be received. As shown in FIG. 11, the method may include the following steps.

Step 1101: A multi-link device generates indication information when a channel state of a channel corresponding to a first link is non-idle.

The first link may be any one of a plurality of links between a multi-link device and a peer multi-link device.

The indication information may indicate that the channel state of the channel corresponding to the first link is non-idle.

Specifically, the multi-link device determines the channel state of the channel corresponding to the first link in a non-idle state, and generates the indication information when signal energy on the first link is greater than a first preset threshold, a network allocation vector NAV of the channel corresponding to the first link is not equal to 0, or the multi-link device receives a data frame over the channel corresponding to the first link.

Step 1102: The multi-link device sends the indication information to the peer multi-link device.

Specifically, the multi-link device may send the indication information to the peer multi-link device over a channel corresponding to a second link.

The second link may be any one of the plurality of links between the multi-link device and the peer multi-link device. Optionally, the second link may be a link that does not support simultaneous data sending and receiving as the first link.

Further, the multi-link device may send an acknowledgment frame to the peer multi-link device over the channel corresponding to the second link.

The acknowledgment frame may include the indication information, and the acknowledgment frame may indicate whether the multi-link device correctly receives data sent by the peer multi-link device over the channel corresponding to the second link.

For example, in FIG. 10B, it is assumed that the multi-link access point device supports simultaneous data sending and receiving between the links L1 and L2, but the multi-link station device 1 does not support simultaneous data sending and receiving between the links L1 and L2, and the link L2 is being occupied by the STA22 of the multi-link station device.

According to the method in FIG. 11, when the AP2 determines that signal energy on the link L2 is greater than a first preset threshold, the AP2 determines that a network allocation vector NAV of the channel corresponding to the link L2 is not equal to 0, or the AP2 is receiving data sent by the STA22, the AP2 generates indication information indicating that the channel state of the channel corresponding to the link L2 is non-idle, and sends the indication information to the multi-link station device 1.

Specifically, the AP2 may notify the AP1 of the indication information, the AP1 sends the indication information to the STA11 through the link L1, and then the STA11 notifies the STA21 of the indication information. When learning that the channel corresponding to the link L2 is in a non-idle state, the STA21 does not send data to the AP2 through the link L2, so as to ensure that the AP2 can normally receive data sent by another multi-link station device through the link L2.

Alternatively, the multi-link station device 1 may send a request message to the multi-link access point device through the link L1, where the request message is used to request to obtain the channel state of the channel corresponding to the link L2. After determining the channel state of the channel corresponding to the link L2, the AP2 in the multi-link access point device generates indication information, and sends the indication information to the multi-link station device 1 through the link L1.

Further, in addition to indicating that the channel corresponding to the first link is in a non-idle state, the indication information sent by the multi-link device to the peer multi-link device may further indicate duration in which the channel corresponding to the first link is in the non-idle state.

Based on the method described in FIG. 11, when the peer-end multi-link device sends data through the second link, cannot receive a data frame through the first link, and cannot determine the channel state of the channel corresponding to the first link, the multi-link device may receive a determining result of the channel state of the channel corresponding to the first link through the second link, and determine the channel state of the channel corresponding to the first link according to the determining result. This avoids a case in which the peer multi-link device incorrectly determines the channel state of the channel corresponding to the first link because the peer multi-link device cannot receive a data frame through the first link.

The foregoing mainly describes the solutions provided in embodiments of this application from a perspective of interaction between devices. It may be understood that to implement the foregoing functions, the devices include hardware structures and/or software modules corresponding to the functions. A person skilled in the art should easily be aware that, in combination with algorithms and steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the terminal may be divided into functional modules based on the foregoing method examples. For example, functional modules may be obtained through division based on functions, or two or more functions may be integrated into one processing module. The integrated module may be implemented in a form of hardware, or may be implemented in a form of a software functional module. It should be noted that in embodiments of this application, division into the modules is an example and is merely logical function division, and may be other division in an actual implementation.

Figure 12:
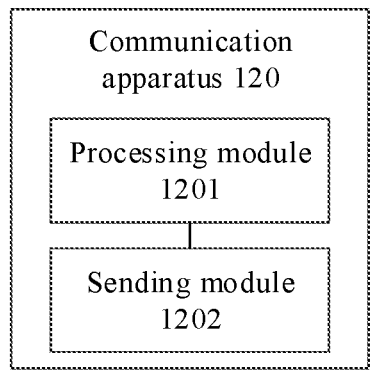
FIG. 12 is a schematic composition diagram of a communication apparatus according to an embodiment of this application.

When the functional modules are obtained through division based on the corresponding functions, FIG. 12 shows a communication apparatus. A communication apparatus 120 may be a multi-link device, or a chip or a system on chip in the multi-link device. The communication apparatus 120 may be configured to perform functions of the multi-link device in the foregoing embodiments. The communication apparatus 120 shown in FIG. 12 includes a processing module 1201 and a sending module 1202.

The processing module 1201 is configured to generate link grouping information indicating that links belonging to different link groups support simultaneous data sending and receiving.

The sending module 1202 is configured to send the link grouping information.

It should be understood that the communication apparatus 120 has any function of the multi-link device in the foregoing method. Details are not described herein again.

In a possible implementation of the communication apparatus 120, the processing module 1201 in FIG. 12 may be implemented by a processor, and the sending module 1202 may be implemented by a transmitter. Optionally, the communication apparatus 120 may further include a memory.

In another possible implementation of the communication apparatus 120, the processing module 1201 in FIG. 12 may be implemented by a processing circuit, and the sending module 1202 may be implemented by an output circuit. Optionally, the communication apparatus 120 may further include a storage medium.

The communication apparatus 120 may also be implemented by using one or more FPGAs (field programmable gate array), PLDs (programmable logic device), controllers, state machines, logic gates, discrete hardware components, any other suitable circuits, or any combination of circuits that can perform various functions described in this application.

It should be understood that the communication apparatuses 120 in the foregoing various product forms have any function of the multi-link device in the foregoing method embodiments, and details are not described herein again.

Figure 13:
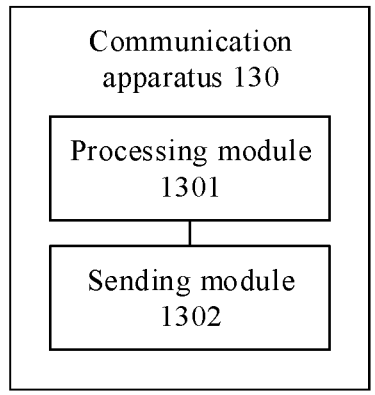
FIG. 13 is a schematic composition diagram of a communication apparatus according to an embodiment of this application.

FIG. 13 is a diagram depicting a structure of a communication apparatus 130. The communication apparatus 130 may be a multi-link device, or a chip or a system on chip in the multi-link device. The communication apparatus 130 may be configured to perform functions of the multi-link device in the foregoing embodiments. The communication apparatus 130 shown in FIG. 13 includes a processing module 1301 and a sending module 1302.

The processing module 1301 is configured to generate indication information when signal energy on a first link is greater than a first preset threshold, a network allocation vector NAV of a channel corresponding to the first link is not equal to 0), or the multi-link device receives a data frame over the channel corresponding to the first link. The indication information indicates that a channel state of the channel corresponding to the first link is non-idle.

The sending module 1302 is configured to send the indication information to a peer multi-link device.

It should be understood that the communication apparatus 130 has any function of the multi-link device in the foregoing method. Details are not described herein again.

In a possible implementation of the communication apparatus 130, the processing module 1301 in FIG. 13 may be implemented by a processor, and the sending module 1302 may be implemented by a transmitter. Optionally, the communication apparatus 130 may further include a memory.

In another possible implementation of the communication apparatus 130, the processing module 1301 in FIG. 13 may be implemented by a processing circuit, and the sending module 1302 may be implemented by an output circuit. Optionally, the communication apparatus 130 may further include a storage medium.

The communication apparatus 130 may also be implemented by using one or more FPGAs (field programmable gate array), PLDs (programmable logic device), controllers, state machines, logic gates, discrete hardware components, any other suitable circuits, or any combination of circuits that can perform various functions described in this application.

It should be understood that the communication apparatuses 130 in the foregoing various product forms have any function of the multi-link device in the foregoing method embodiments, and details are not described herein again.

Figure 14:
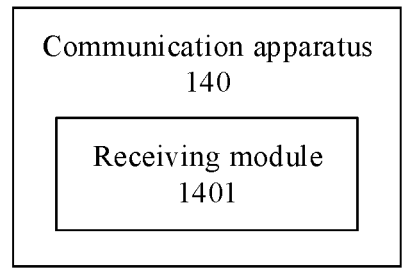
FIG. 14 is a schematic composition diagram of a communication apparatus according to an embodiment of this application.

FIG. 14 is a diagram depicting a structure of a communication apparatus 140. The communication apparatus 140 may be a peer multi-link device, or a chip or a system on chip in a peer multi-link device. The communication apparatus 140 may be configured to perform functions of the peer multi-link device in the foregoing embodiments. In a possible implementation, the communication apparatus 140 shown in FIG. 14 includes a receiving module 1401.

The receiving module 1401 is configured to receive indication information from a multi-link device. The indication information indicates that a channel state of a channel corresponding to a first link is non-idle.

It should be understood that the communication apparatus 140 has any function of the peer multi-link device in the foregoing method. Details are not described herein again.

In a possible implementation of the communication apparatus 140, the receiving module 1401 in FIG. 14 may be implemented by a receiver. Optionally, the communication apparatus 140 may further include a memory.

In another possible implementation of the communication apparatus 140, the receiving module 1401 in FIG. 14 may be implemented by an input circuit. Optionally, the communication apparatus 140 may further include a storage medium.

The communication apparatus 140 may also be implemented by using one or more FPGAs (field programmable gate array). PLDs (programmable logic device), controllers, state machines, logic gates, discrete hardware components, any other suitable circuits, or any combination of circuits that can perform various functions described in this application.

It should be understood that the communication apparatuses 140 in the foregoing various product forms have any function of the multi-link device in the foregoing method embodiments, and details are not described herein again.

An embodiment of this application further provides a computer-readable storage medium. All or some of the processes in the foregoing method embodiments may be completed by a computer program instructing related hardware. The program may be stored in the foregoing computer-readable storage medium. When the program is executed, the processes of the foregoing method embodiments may be performed. The computer-readable storage medium may be an internal storage unit of a terminal (including a data transmit end and/or a data receive end) in any one of the foregoing embodiments, for example, a hard disk or a memory of the terminal. Alternatively, the computer-readable storage medium may be an external storage device of the terminal, for example, a plug-in hard disk, a smart media card (SMC), a secure digital (SD) card, a flash card, or the like that are equipped on the terminal. Further, the computer-readable storage medium may alternatively include both the internal storage unit and the external storage device of the terminal. The computer-readable storage medium is configured to store the computer program and other programs and data that are required by the terminal. The computer-readable storage medium may be further configured to temporarily store data that has been output or is to be output.

It should be noted that, in the specification, claims, and accompanying drawings of this application, terms "first". "second", and the like are intended to distinguish between different objects but do not indicate a particular order. In addition, the terms "including", "having", and any other variant thereof are intended to cover non-exclusive inclusion. For example, a process, method, system, product, or device that includes a series of steps or units is not limited to the listed steps or units, but optionally further includes an unlisted step or unit, or optionally further includes another inherent step or unit of the process, method, product, or device.

It should be understood that, in this application, "at least one (item)" means one or more, "a plurality of" means two or more, "at least two (items)" means two, three, or more, and "and/or" is used to describe an association relationship between associated objects, and indicates that there may be three relationships. For example, "A and/or B" may indicate that only A exists, only B exists, and both A and B exist, where A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division of the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as discrete components may or may not be physically separate, and components displayed as units may be one or more physical units, that is, may be located in one place, or may be distributed to a plurality of different places. Some or all of the units may be selected based on an actual requirement to achieve an objective of the solutions of the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claim.

What is claimed is:

1. A multi-link communication method, comprising:
   generating, by a multi-link device, link grouping information identifying links belonging to different link groups, wherein the link grouping information is associated with links such that any two links belonging to different ones of the different link groups support simultaneous data sending and receiving; and
   sending, by the multi-link device, the link grouping information to a peer multi-link device.

2. The method according to claim 1, wherein at least two links do not support simultaneous data sending and receiving in a same link group.

3. The method according to claim 1, wherein at least one link does not support simultaneous data sending and receiving with any other link in a same link group.

4. The method according to claim 1, wherein the link grouping information comprises a link profile of each link; and
   the link profile of each link comprises:
   an operating class of the link, a channel number of the link, and a link group identifier of a link group to which the link belongs;
   an operating class of the link, a channel number of the link, and a primary/secondary link identifier of the link; or
   an operating class of the link and a channel number of the link.

5. The method according to claim 1, wherein a same link group comprises a primary link and a secondary link, and sending, by the multi-link device, data to the peer multi-link device comprises:
   contending, by the multi-link device, for a channel on the primary link, and sending data to the peer multi-link device over the channel after successfully contending for the channel on the primary link; and
   responsive to determining that at least one conditions is met, sending, by the multi-link device, data to the peer multi-link device over a channel corresponding to the secondary link, wherein the at least one condition comprises:
   a channel state of the channel corresponding to the secondary link is idle; or
   a channel state of the channel corresponding to the secondary link changes from non-idle to idle, and data is being sent through the primary link.

6. The method according to claim 5, wherein determining that the channel state of the channel corresponding to the secondary link is idle comprises:

determining that signal energy on the secondary link is less than a first preset threshold; or determining that a network allocation vector (NAV) of the channel corresponding to the secondary link is equal to 0, and signal energy on the secondary link is less than a first preset threshold.

7. The method according to claim 5, wherein:
the data sent through the primary link is carried in a first physical layer protocol data unit (PPDU), the data sent through the secondary link is carried in a second PPDU, and a time difference between an end time of the first PPDU and an end time of the second PPDU is less than a second preset threshold.

8. The method according to claim 5, wherein the method further comprises:
receiving, by the multi-link device, capability information from the peer multi-link device, wherein the capability information indicates whether any two of a plurality of primary links support simultaneous data sending and receiving.

9. The method according to claim 1, wherein:
the multi-link device is a multi-link access point device, and the peer multi-link device is a multi-link station device; or
the multi-link device is a multi-link station device, and the peer multi-link device is a multi-link access point device; or
the multi-link device is a multi-link station device, and the peer multi-link device is a multi-link station device.

10. A multi-link device, comprising:
a processor, configured to generate link grouping information identifying links belonging to different link groups, wherein the link grouping information is associated with links such that any two links belonging to different ones of the different link groups support simultaneous data sending and receiving; and
a transceiver, configured to send the link grouping information to a peer multi-link device.

11. The multi-link device according to claim 10, wherein the links further meets a following characteristic: at least two links do not support simultaneous data sending and receiving in a same link group.

12. The multi-link device according to claim 10, wherein at least one link does not support simultaneous data sending and receiving with any other link in a same link group.

13. The multi-link device according to claim 10, wherein the link grouping information comprises a link profile of each link; and
the link profile of each link comprises:
an operating class of the link, a channel number of the link, and a link group identifier of a link group to which the link belongs;

an operating class of the link, a channel number of the link, and a primary/secondary link identifier of the link; or
operating class of the link and a channel number of the link.

14. The multi-link device according to claim 10, wherein a same link group comprises a primary link and a secondary link, and sending data to the peer multi-link device comprises:
contending for a channel on the primary link, and sending data to the peer multi-link device over the channel after successfully contending for the channel on the primary link; and
responsive to determining that at least one conditions is met, sending data to the peer multi-link device over a channel corresponding to the secondary link, wherein the at least one condition comprises:
a channel state of the channel corresponding to the secondary link is idle; or
a channel state of the channel corresponding to the secondary link changes from non-idle to idle, and data is being sent through the primary link.

15. The multi-link device according to claim 14, wherein determining that the channel state of the channel corresponding to the secondary link is idle comprises:
determining that signal energy on the secondary link is less than a first preset threshold; or
determining that a network allocation vector (NAV) of the channel corresponding to the secondary link is equal to 0, and signal energy on the secondary link is less than a first preset threshold.

16. The multi-link device according to claim 14, wherein the data sent through the primary link is carried in a first physical layer protocol data unit (PPDU), the data sent through the secondary link is carried in a second PPDU, and a time difference between an end time of the first PPDU and an end time of the second PPDU is less than a second preset threshold.

17. The multi-link device according to claim 14, wherein the transceiver is further configured to:
receive capability information from the peer multi-link device, wherein the capability information indicates whether any two of a plurality of primary links support simultaneous data sending and receiving.

18. The multi-link device according to claim 10, wherein:
the multi-link device is a multi-link access point device, and the peer multi-link device is a multi-link station device;
the multi-link device is a multi-link station device, and the peer multi-link device is a multi-link access point device; or
the multi-link device is a multi-link station device, and the peer multi-link device is a multi-link station device.

* * * * *

UNITED STATES PATENT AND TRADEMARK OFFICE
CERTIFICATE OF CORRECTION

| | | |
|---|---|---|
| PATENT NO. | : 12,273,944 B2 | Page 1 of 1 |
| APPLICATION NO. | : 17/859814 | |
| DATED | : April 8, 2025 | |
| INVENTOR(S) | : Guo et al. | |

It is certified that error appears in the above-identified patent and that said Letters Patent is hereby corrected as shown below:

In the Claims

Claim 5: Column 36, Line 55: "responsive to determining that at least one conditions is" should read as -- responsive to determining that at least one condition is --.

Claim 11: Column 37, Line 41: "the links further meets a following characteristic: at least" should read as -- the links further meet a following characteristic: at least --.

Claim 14: Column 38, Line 14: "responsive to determining that at least one conditions is" should read as -- responsive to determining that at least one condition is --.

Signed and Sealed this
Thirtieth Day of September, 2025

John A. Squires
*Director of the United States Patent and Trademark Office*